July 30, 1957  C. F. BALL  2,801,095
VEIN DISINTEGRATING AND MATERIAL HANDLING APPARATUS
Original Filed Oct. 19, 1950  12 Sheets-Sheet 2
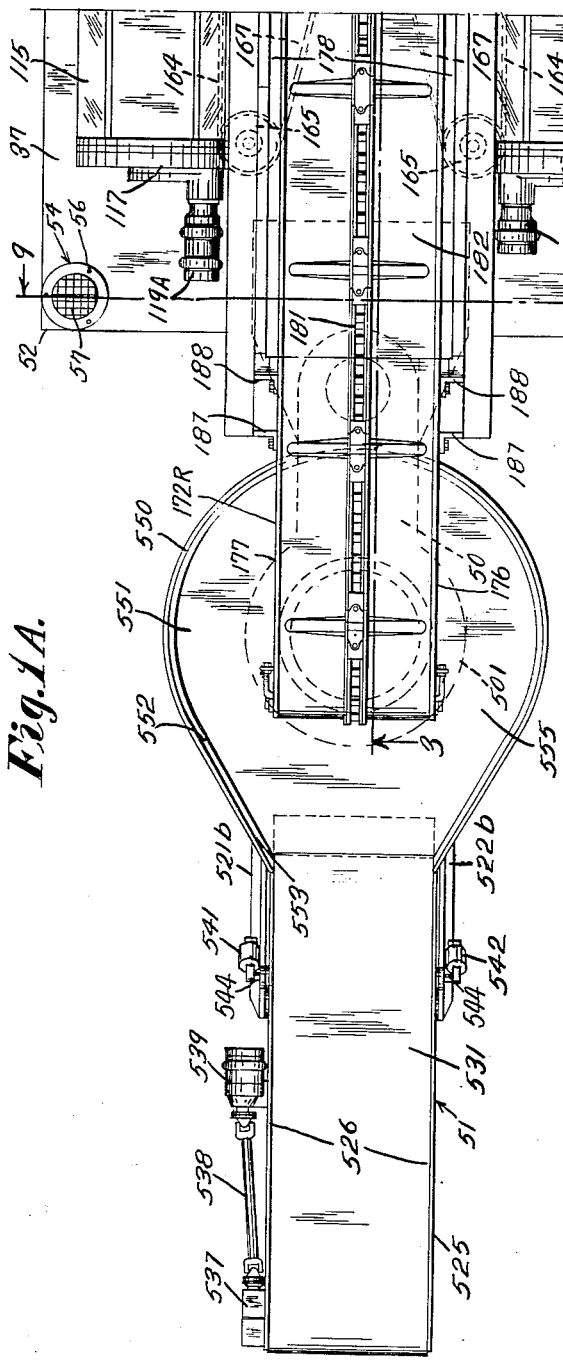
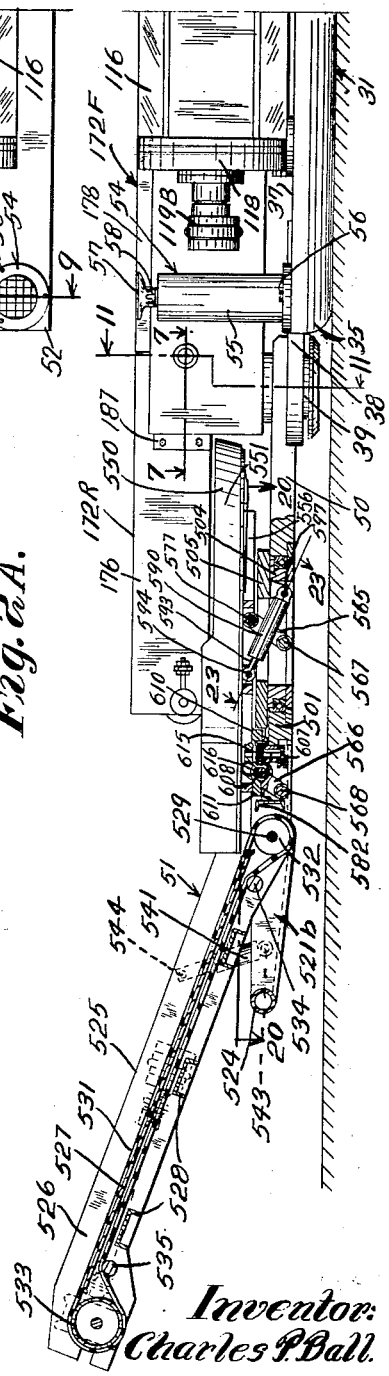
Inventor:
Charles F. Ball.
By Luis A. Winxom.
Attorney.

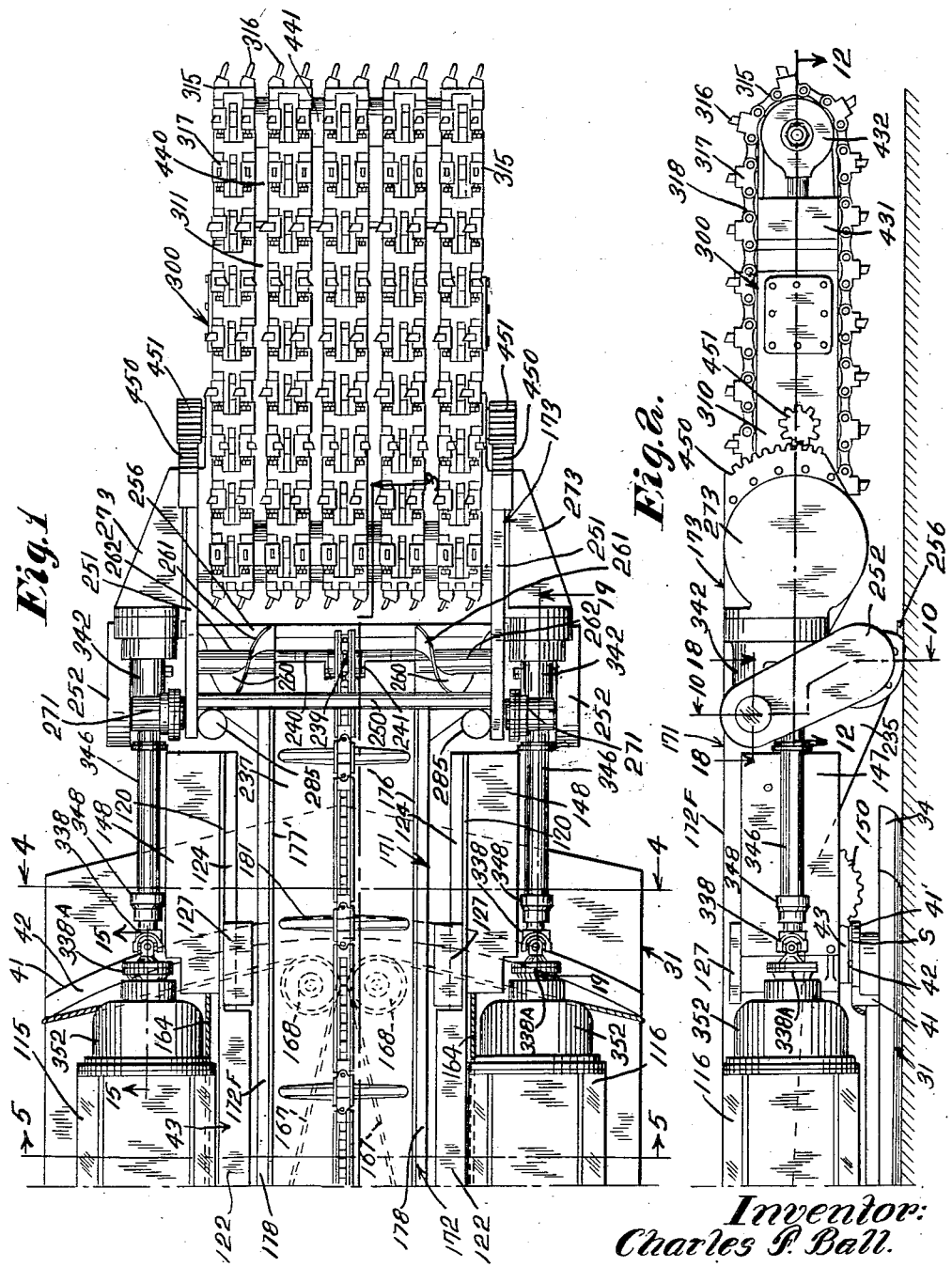

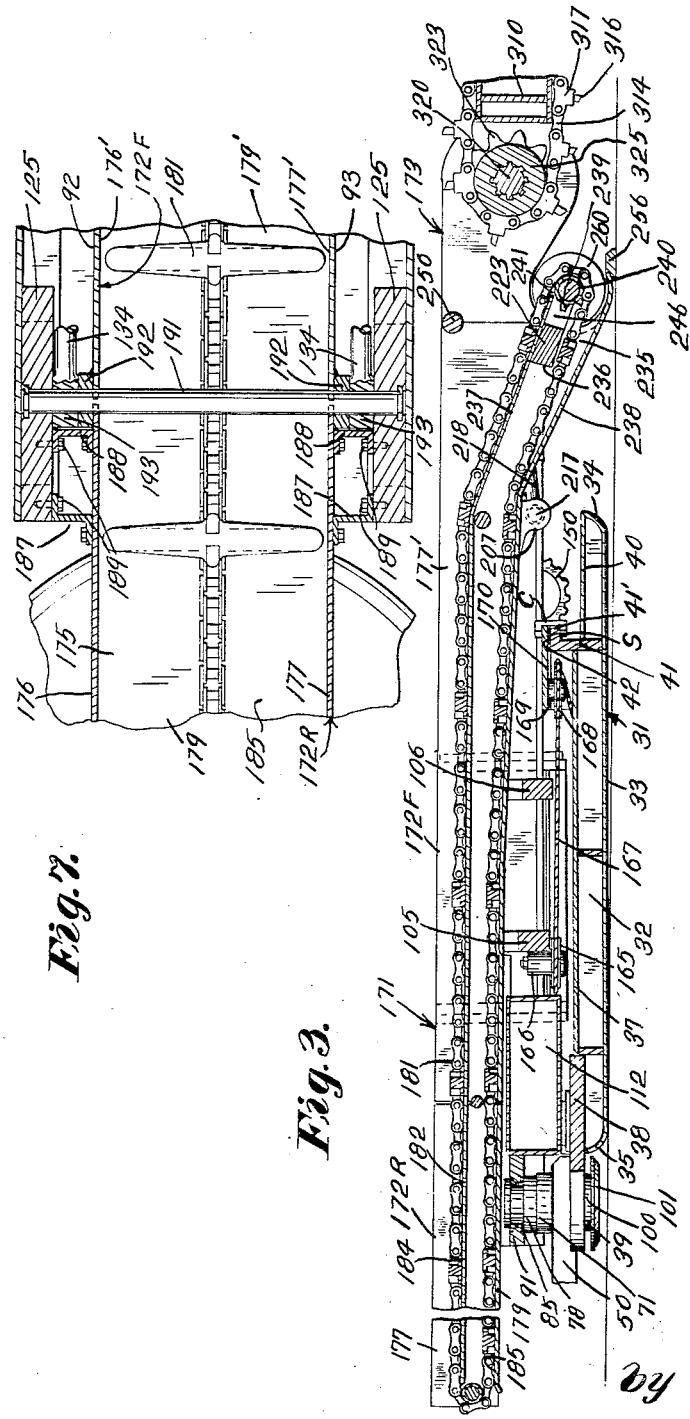

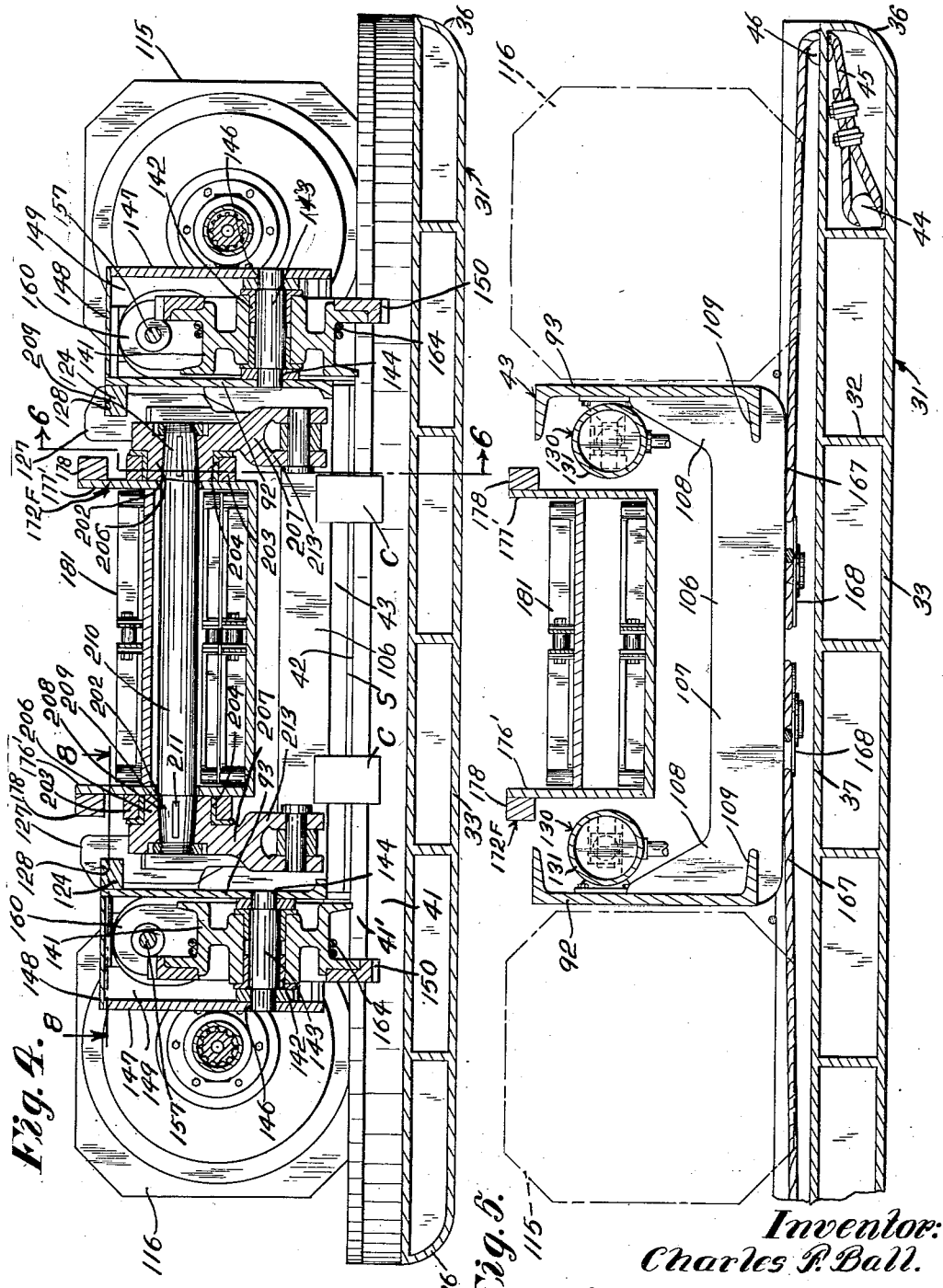

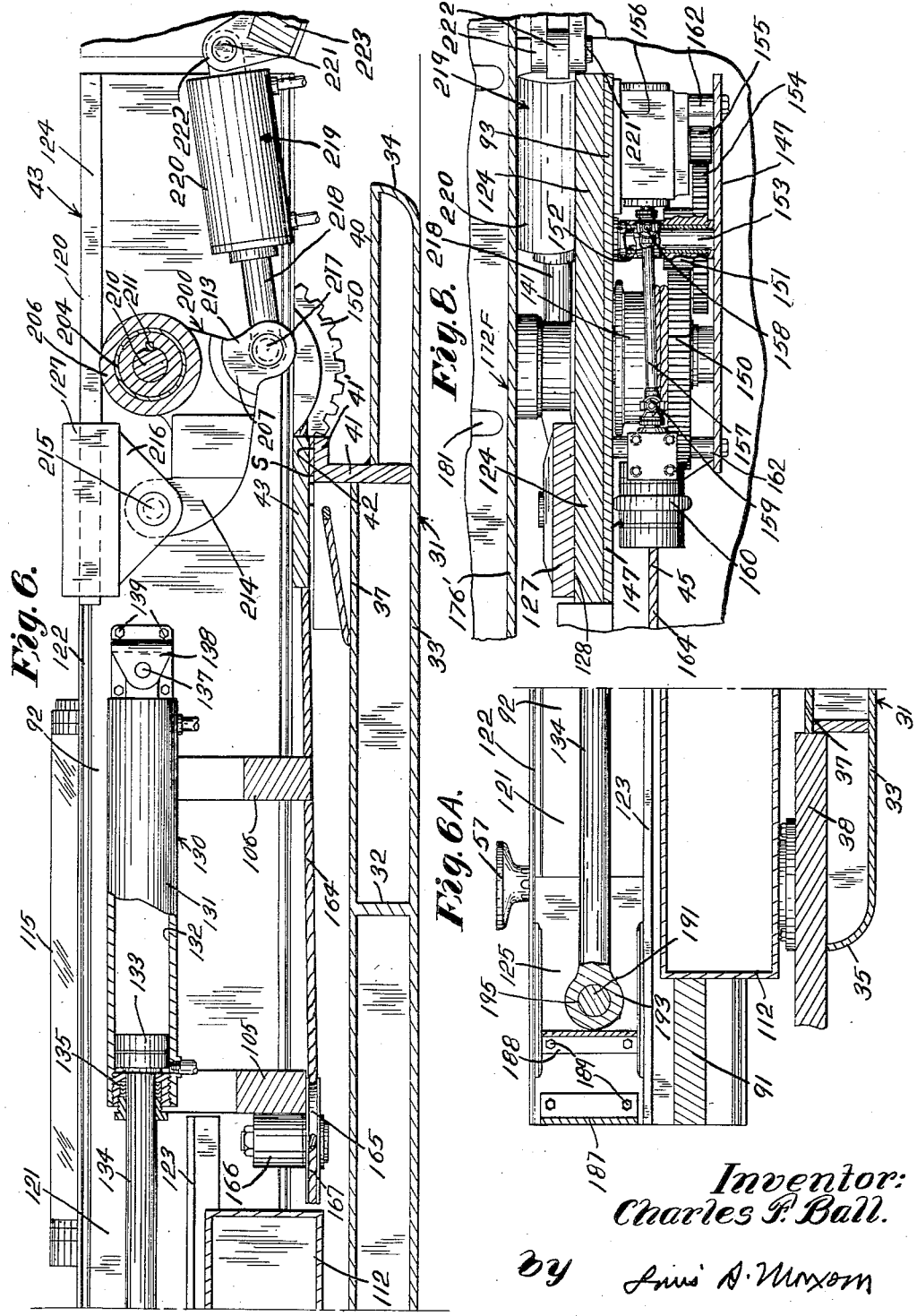

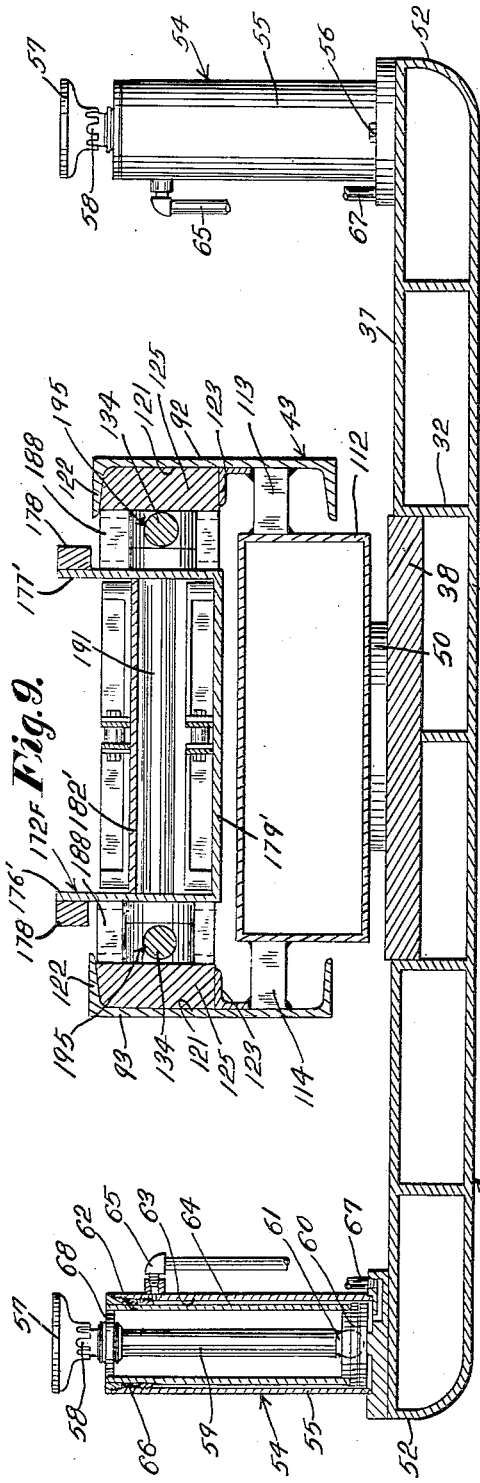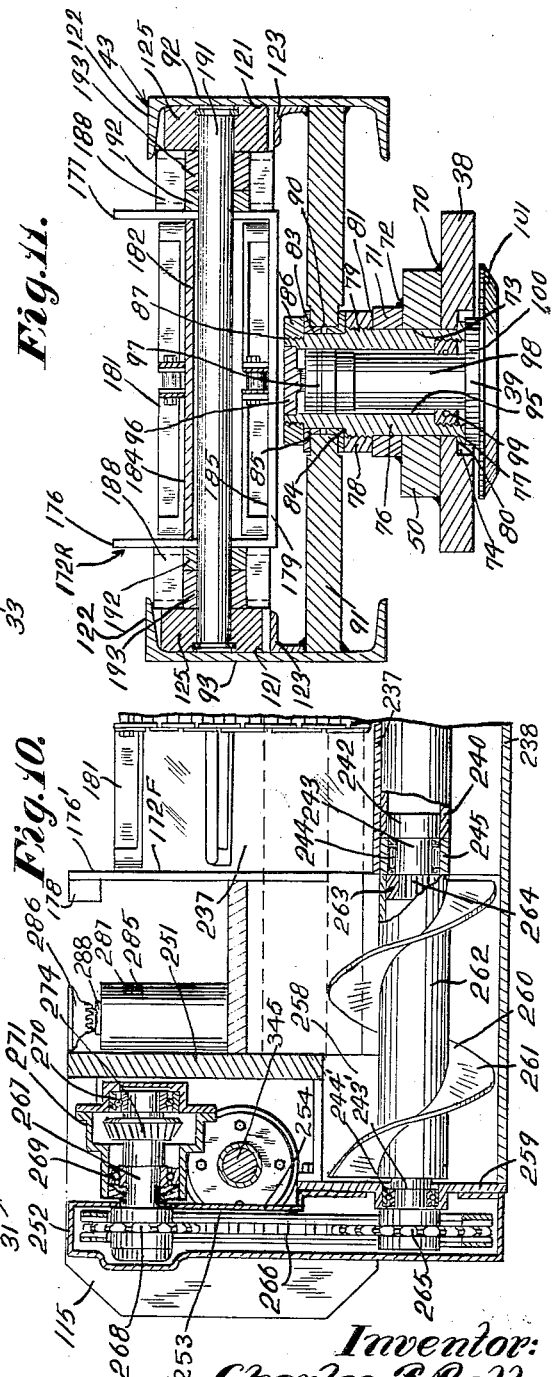

July 30, 1957   C. F. BALL   2,801,095
VEIN DISINTEGRATING AND MATERIAL HANDLING APPARATUS
Original Filed Oct. 19, 1950   12 Sheets-Sheet 7
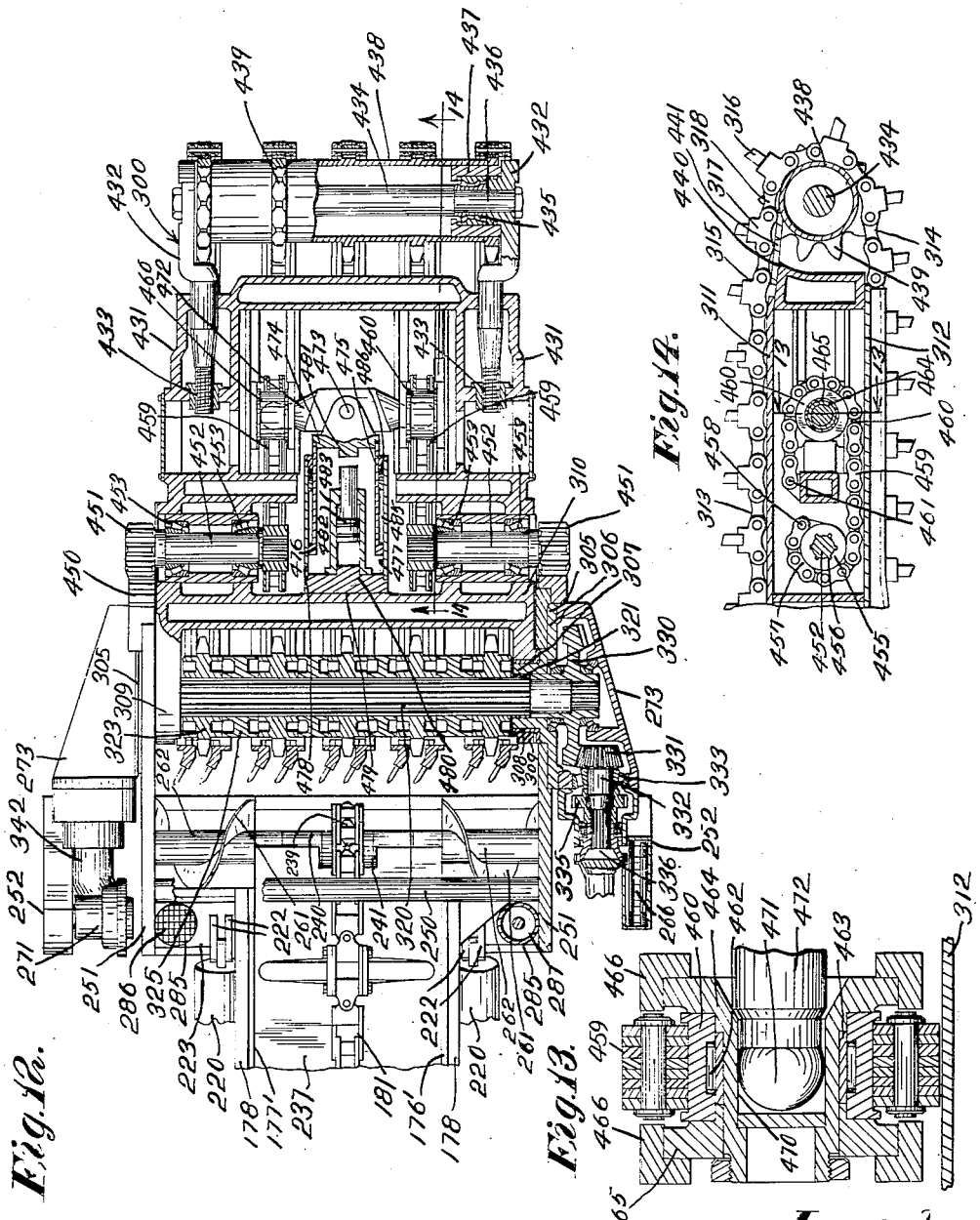
Inventor:
Charles F. Ball.
by Louis A. Moxon.
Attorney.

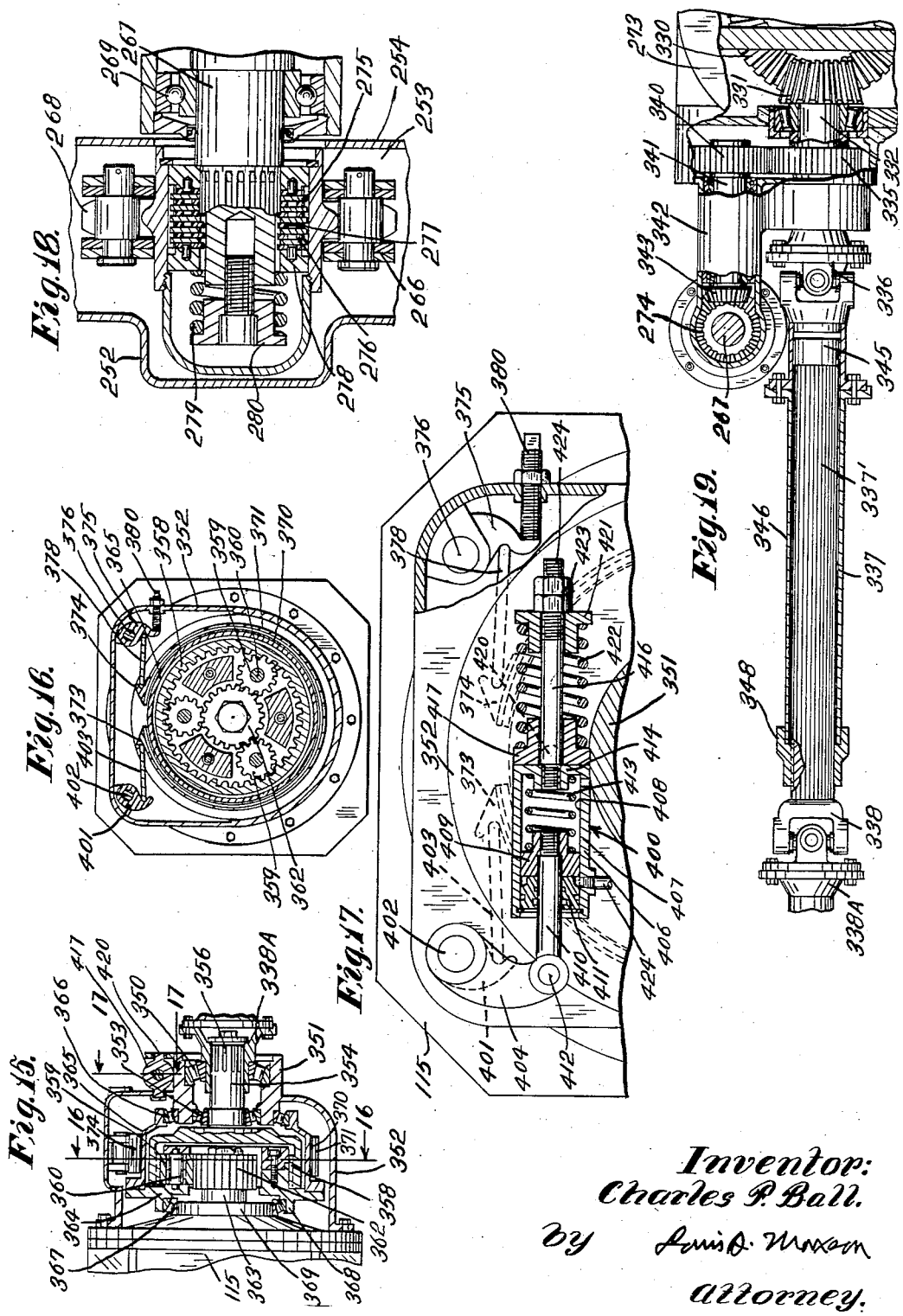

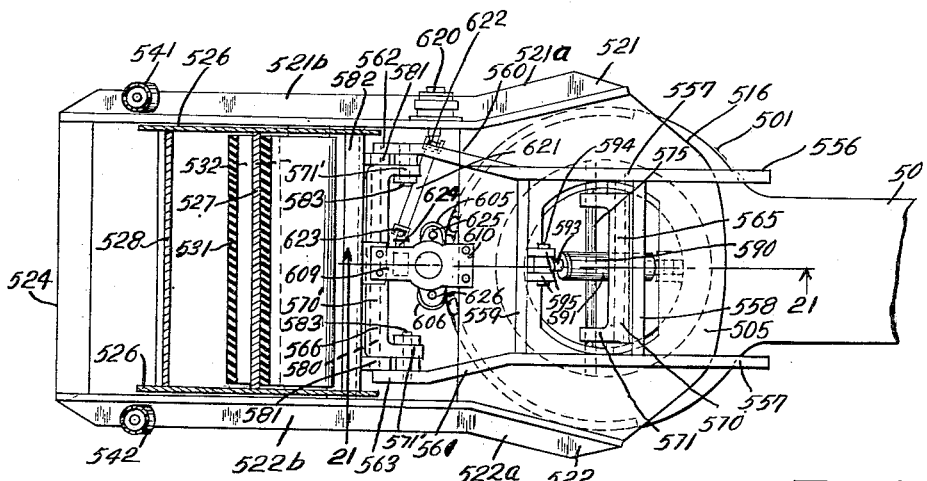
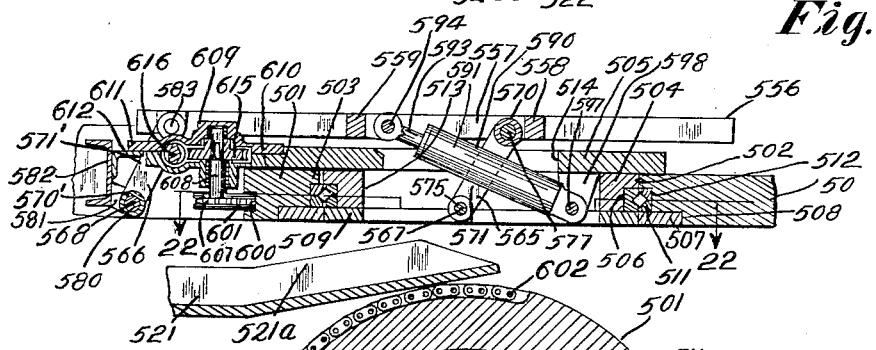

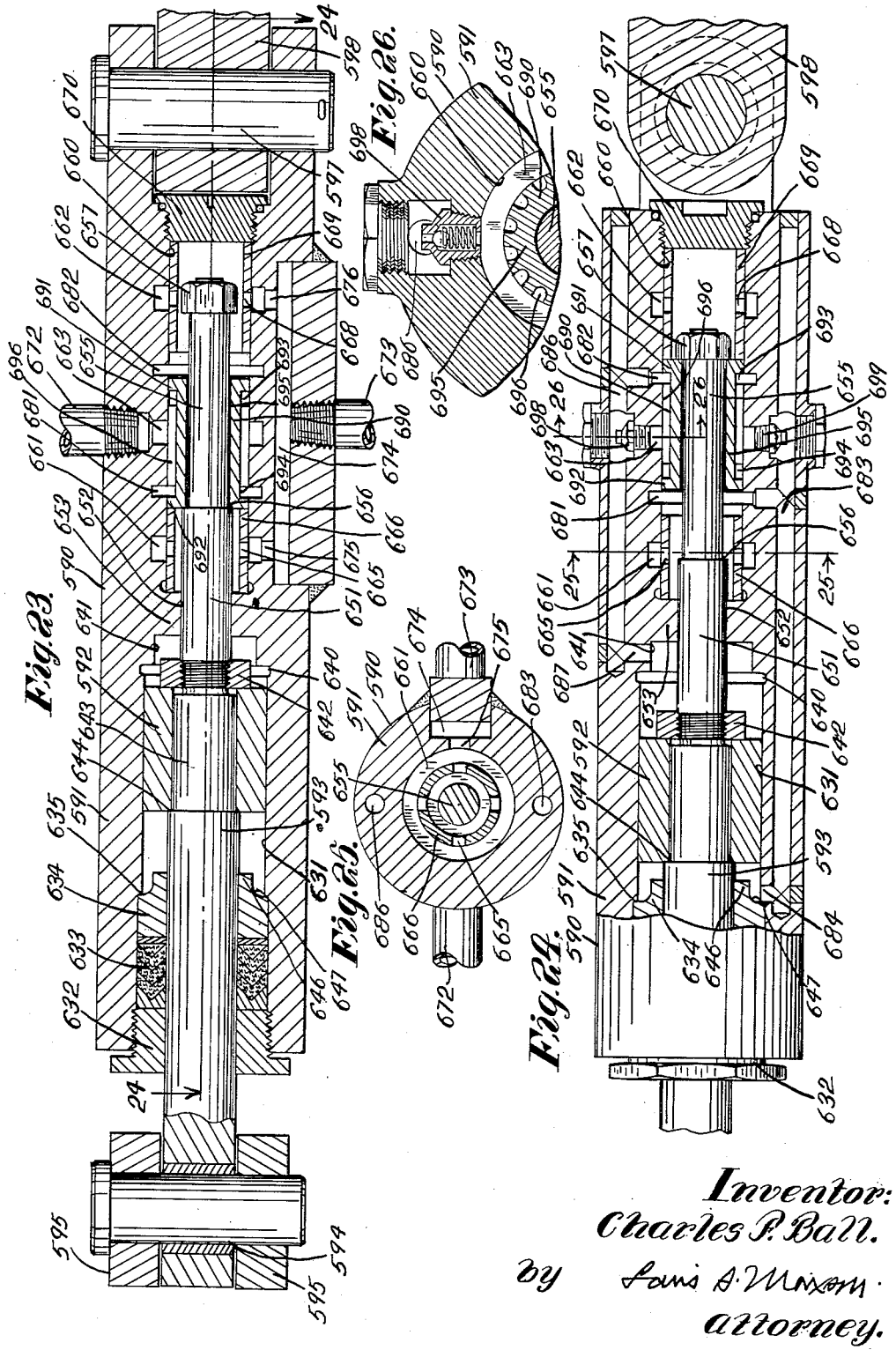

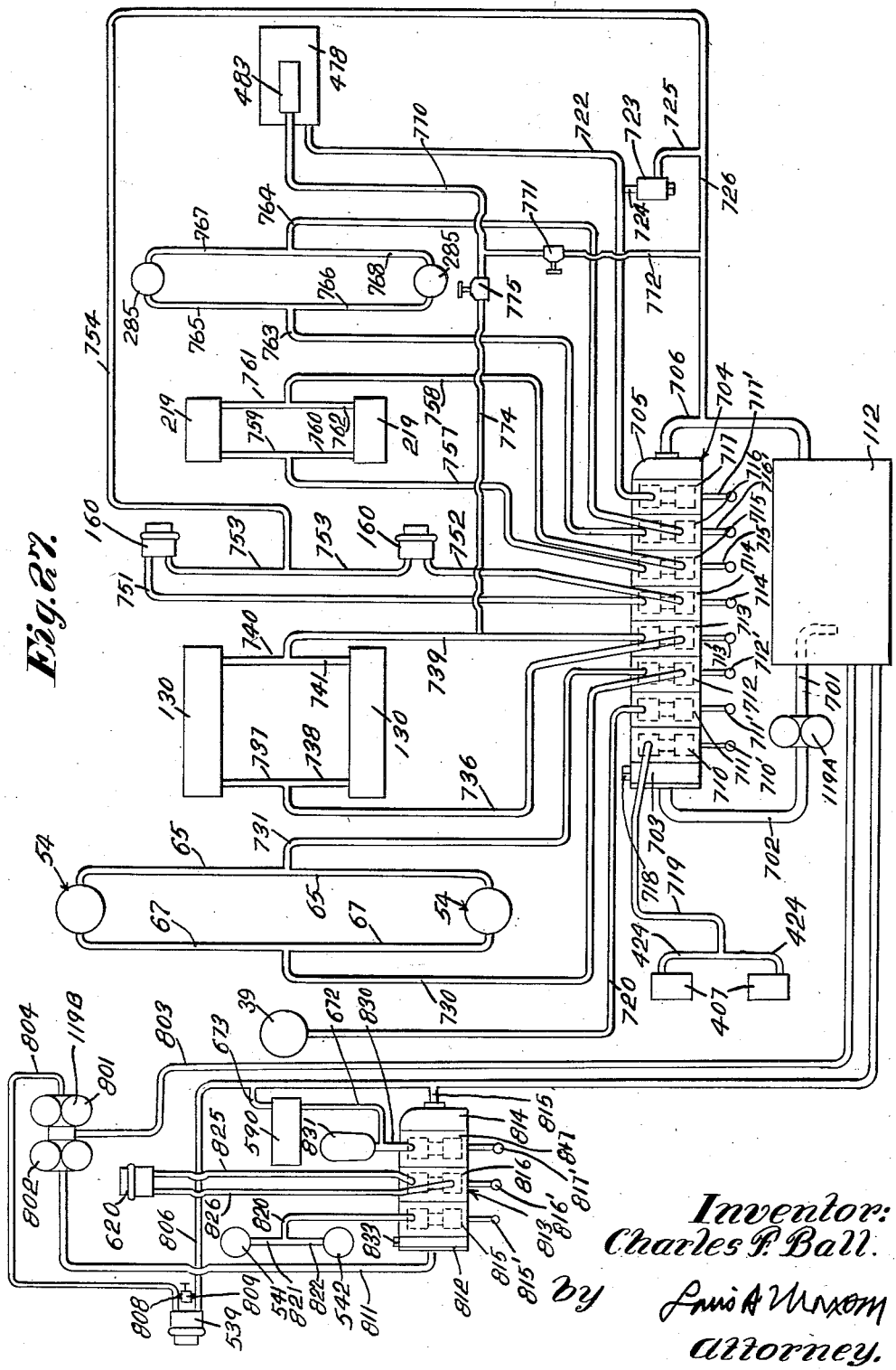

July 30, 1957  C. F. BALL  2,801,095
VEIN DISINTEGRATING AND MATERIAL HANDLING APPARATUS
Original Filed Oct. 19, 1950. 12 Sheets—Sheet 12
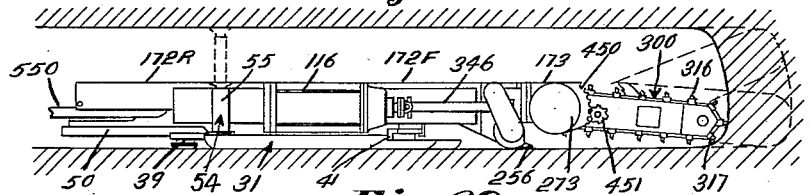
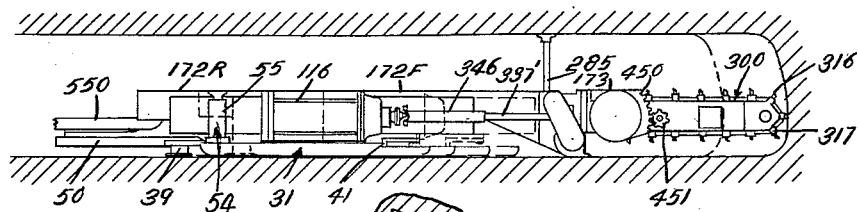
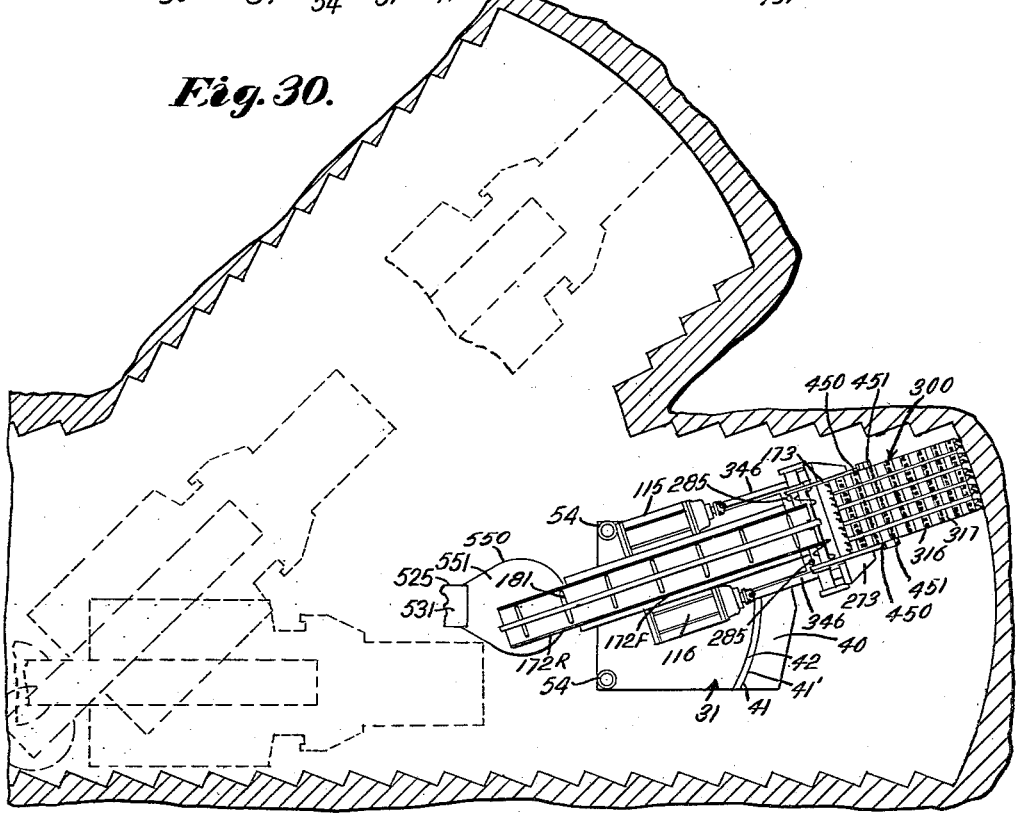
Inventor:
Charles F. Ball.
by
Attorney.

United States Patent Office 2,801,095
Patented July 30, 1957

2,801,095

VEIN DISINTEGRATING AND MATERIAL HANDLING APPARATUS

Charles F. Ball, Franklin, Pa., assignor to Joy Manufacturing Company, Pittsburgh, Pa., a corporation of Pennsylvania Continuation of application Serial No. 191,004, October 19, 1950. This application June 21, 1956, Serial No. 594,339

48 Claims. (Cl. 262—29)

This invention relates to apparatus for mining coal or other minerals from the solid and for concurrently handling and moving the coal or other minerals so mined in such manner that the same may be delivered to a mine transportation system without manual handling. From other aspects, it relates to improved apparatus for supporting, feeding and adjusting the position of vein attacking and disintegrating apparatus and associated conveying apparatus, to improved disintegrated material receiving and discharging apparatus, to improved disintegrating apparatus swinging and controlling devices, to improved power transmission mechanism having automatic overload control, to improved bottom clean-up apparatus, and to improved distributing valve mechanism for an expansible chamber motor. Other aspects of the invention will hereinafter more fully appear.

The general objects of the invention are to improve the construction, and in consequence thereof the operation, of machines for mining coal and other solid materials that occur in veins, of the type in which the material is mined and concurrently carried to transportation equipment, and to improve the construction and consequent operation of units that may advantageously be incorporated in such machines—all to the end that coal or other material may be mined rapidly and economically in desired form.

Specific objects of the invention will appear from the ensuing description of it.

My invention may be incorporated, in a preferred embodiment thereof, in an apparatus which includes a skid or base slidably supported on a mine floor, an intermediate frame supported on the base for swinging in horizontal planes about an axis desirably located at the rear end of the skid or base, and a mechanism slidably supported by the intermediate frame for reciprocation longitudinally relative to the latter and including a primary disintegrated material receiving and conveying apparatus and a vein attacking and disintegrating apparatus disposed at the forward end of the disintegrated material receiving and conveying apparatus and discharging material thereto. The main base desirably supports a secondary or delivery conveyor, including a material receiving hopper of such size and so disposed that the primary material receiving and conveying apparatus may discharge to such hopper in all of the different lateral and longitudinal positions of such apparatus, and said hopper has associated with it a delivery conveyor, the hopper and delivery conveyor being mounted for turning upon an upright axis relative to the main base or skid and the delivery conveyor being swingable vertically relative to the hopper. Suitable means for effecting delivery of material from the hopper to the delivery conveyor may be provided, as by, in effect, making the hopper a shaker conveyor.

The main base previously referred to may be in the form of a hollow, shallow skid, built up of suitable metal plates and bulkheaded for rigidity, and having in the illustrative embodiment of the invention a rearwardly projecting frame of rugged construction supporting a floor jack and providing, coaxial with the floor jack, a pivotal mounting for the intermediate frame. The base, as illustrated, carries an arcuate guide and support for the intermediate frame at a point well forward of the pivot of the latter, and the base also provides points of attachment for flexible elements used in effecting relative lateral movements between the base and the intermediate frame.

The intermediate frame, pivotally connected adjacent its rear end to the base frame, includes, desirably, a pair of laterally spaced side frame members, connected together at at least three points differently spaced longitudinally thereof and supporting at their outer sides a pair of motors which constitute the sources of power for the apparatus. This intermediate frame also carries hydraulic cylinder and piston mechanism for effecting reciprocation of the material disintegrating and primary receiving and conveying apparatus previously referred to, and also drum and sheave arrangements for effecting relative lateral adjustment between the intermediate frame and the base. The intermediate frame is in part supported by an arcuate element cooperating with the arcuate guide frame on the base.

The intermediate frame support slides, which are, as illustrated, constituted by front and rear pairs of shoes or supports slidably guided by the side frame elements of the intermediate frame. The rearward shoes or slidable supports support the rearward end of the primary material receiving and conveying apparatus, which rearward end, as illustrated, is fixed in horizontal planes but which may move back and forth along the intermediate frame with the remainder of the primary material receiving and conveying apparatus. The primary material receiving and conveying apparatus includes a channel-like frame including a rearward fixed portion forming a portion of the structure just described, and an elongated forward portion which is pivoted at its rear end on the rearward crosshead or slide. The side frame elements of the channel-like frame also support a head structure which carries the disintegrating mechanism, which is mounted for swinging in vertical planes, and said frame also has a downwardly extending portion on which a floor clean-up arrangement is rotatably supported. The downwardly extending portion has at its bottom a floor-engaging skid or shoe which may be brought into contact with the mine floor and serve as a support on the floor in such a manner that the base frame and the intermediate frame may both be lifted at their forward ends, leaving the apparatus supported on the mine floor by the rearward end of the base and by the floor-engaging skid or shoe, which is in fixed relation to the conveyor frame, as is later described. As will later appear, many features of the invention are independent of the base construction, and may be employed with a "cat" or even a wheel mounted base.

In the accompanying drawings, in which, for purposes of illustration, one embodiment of the invention is shown:

Figs. 1 and 1A are plan views which, taken together, are adapted to show the top of an entire continuous mining apparatus.

Figs. 2 and 2A are side elevational views which, taken together, provide a side view of the continuous mining apparatus of Figs. 1 and 1A.

Fig. 3 is a longitudinal vertical section, with parts broken away, and on a slightly reduced scale, the section being taken on the plane of the section line 3—3 of Figs. 1 and 1A, and showing the parts in relatively different positions with respect to each other.

Fig. 4 is a transverse vertical section on an enlarged scale, and is taken on the plane of the line 4—4 of Fig. 1.

Fig. 5 is a transverse vertical section on the same scale as Fig. 4, and taken on the plane of the line 5—5 of Fig. 1.

Fig. 6 is a longitudinal vertical section on the plane of the line 6—6 of Fig. 4, the view being on the same scale as Fig. 4.

Fig. 6A is a longitudinal vertical section also on the plane of the section line 6—6 of Fig. 4, and constitutes a continuation of Fig. 6 towards the rear of the apparatus.

Fig. 7 is a horizontal section on the plane of the line 7—7 of Fig. 2A.

Fig. 8 is a horizontal section on the plane of the line 8—8 of Fig. 4.

Fig. 9 is a vertical transverse section on an enlarged scale taken on the plane of the line 9—9 of Fig. 1A.

Fig. 10 is a transverse section on an enlarged scale essentially on the planes of the line 10—10 of Fig. 2.

Fig. 11 is a vertical transverse section on an enlarged scale on the planes of the line 11—11 of Fig. 2A.

Fig. 12 is an enlarged horizontal section through the disintegrating mechanism, the section being taken on the plane of the line 12—12 of Fig. 2.

Fig. 13 is a fragmentary vertical section on the plane of the section line 13—13 of Fig. 14, the view being on an enlarged scale.

Fig. 14 is a fragmentary longitudinal vertical section on the plane of the line 14—14 of Fig. 12.

Fig. 15 is a vertical section on the plane of the line 15—15 of Fig. 1, on an enlarged scale.

Fig. 16 is a vertical transverse section on the plane of the line 16—16 of Fig. 15.

Fig. 17 is a fragmentary vertical transverse section on a much enlarged scale, taken on the plane of the line 17—17 of Fig. 15.

Fig. 18 is a horizontal section on a much enlarged scale, taken on the plane of the line 18—18 of Fig. 2, the view being turned 90°.

Fig. 19 is a vertical section on an enlarged scale on the plane of the line 19—19 of Fig. 1.

Fig. 20 is a horizontal section, on a slightly enlarged scale, on the plane of the section line 20—20 of Fig. 2A.

Fig. 21 is a vertical section, on an enlarged scale, on the plane of the section line 21—21 of Fig. 20.

Fig. 22 is a horizontal section on the planes of the section line 22—22 of Fig. 21.

Fig. 23 is a much enlarged section on the plane of the line 23—23 of Fig. 2A.

Fig. 24 is a section on the plane of the line 24—24 of Fig. 23.

Fig. 25 is a transverse section on the plane of the line 25—25 of Fig. 24.

Fig. 26 is a transverse section on the plane of the line 26—26 of Fig. 24, the view being on an enlarged scale.

Fig. 27 is a diagrammatic view showing the hydraulic system of the apparatus.

Figs. 28, 29, and 30 are diagrammatic views showing the apparatus in operation, Figs. 28 and 29 showing the apparatus in side elevation, and Fig. 30 in plan.

As previously indicated, the illustrative embodiment of the invention includes a main base 31 (see Figs. 1, 3, 4, 5 and 9), which is built up of plate sections and bulkheaded as indicated at 32 to give it rigidity. The base 31 includes, as shown, a bottom plate 33 having upwardly bent forward and rearward end portions 34 and 35 and upwardly curved side portions 36, 36. Supported upon the bulkheading 32 there is provided a main top plate 37 secured to the bottom plate and also to a heavy rearward plate 38 (see Figs. 2A, 3 and 6A) which serves as a mounting for a floor jack 39, and for delivery conveyor mechanism later more fully described. In addition to the main top plate 37 there is provided a forward top plate 40, and secured to the two top plates, and resting on and secured also to the bottom plate 33, is an arcuate guide or supporting and guiding member 41 (see Figs. 1, 2, 4 and 6) curved on an arc struck from the axis of the floor jack 39 and extending for the full width of the base 31. The guide 41 has a top surface 42 adapted to be engaged by a shoe portion S on an intermediate frame 43, of which more will shortly be said. Two elements C (see Figs. 3 and 4) are provided to insure raising of the base 31 with the intermediate frame 43 when the latter is elevated in the manner later described. These elements C have portions which underlie a flange portion 41' on the guide 41. As shown in Fig. 5, the base 31 is provided at one side with an eye element 44, receiving one end of a cable 45, used in effecting relative lateral adjustment between the intermediate frame 43 and the base 31. The eye and cable are duplicated at opposite sides of the base 31; and the cables are extended around rounded members 46 fixed to the base frame top plate 37 in any suitable manner, and serving to provide a surface of sufficient radius to prevent the destruction of the cable elements.

A heavy plate 50 is welded to the plate 38 and extends rearwardly of the ground engaging portion of the base 31, and this plate 50 supports delivery conveyor means 51, which will be described later. In each of the rearward corners 52, 52 of the base 31 there is mounted a roof jack 54 (see Fig. 1A), these including cylinders 55 secured as at 56 to the top of the plate 37, and roof engaging plate elements 57 "universally" mounted as at 58 on the upper ends of piston rods 59 supported by pistons 60 by means of ball and socket mountings 61. It will be evident that the piston rods 59 will be adapted to the different heights of the mine rooms or entries in which the apparatus operates. The pistons 60 have associated with them cylindrical members 62 of smaller diameters than said pistons, and between these members and the bore 63 of each cylinder there is provided an annular space 64 to which fluid is delivered through a conduit 65, to retract the jack. Suitable packings 66 are arranged at the upper ends of the cylinder members 55 to prevent escape of fluid along the walls of the cylindrical members 62. Conduits 67 lead to the cylinder bores 63 beneath the pistons 60 to deliver fluid to extend the jacks. Flexible annuli 68 are mounted at the upper ends of the cylindrical members 62. These normally hold the piston rods 59 coaxial with the cylinders 55, but permit lateral give.

As shown in Fig. 11, the heavy plate sections 38 and 50 are welded together as at 70, and a ring member 71 is welded as at 72 to the plate 50. A bore 73 extends through the plates 38 and 50 and the ring 71, and the plate 38 has a counterbore 74 coaxial with the bore 73, and a combined cylinder member and pivot-providing member 76 is received in the bore 73 and has a flange 77 received in the counterbore 74. It is held in position by a nut 78 coacting with a threaded portion 79 on the member 76 and clamping the flange 77 against a surface 80 on the plate 38 and itself engaging a surface 81 on the ring 71. The diameter of the member 76 is reduced as at 83, providing a shoulder at 84, which supports one side of a sleeve bearing 85 which is held in position by a nut 86 cooperating with the threaded upper portion 87 of the member 76. The sleeve bearing 85 is received in a circular opening 90 in a heavy plate 91, which forms one of a plurality of connecting members extending between laterally spaced channel sections 92 and 93, which form portions of the intermediate frame 43. It will be observed that this intermediate frame 43 is pivotally supported for turning upon a vertical axis coaxial with the floor jack 39.

The member 76 is provided with a bore 95 closed at its top by a head 96 and forming a cylinder within which there is a piston 97 having a piston rod 98 of reduced diameter, which extends through a suitable packing 99 in a lower head 100, which constitutes a closure for the lower end of the bore 95. The piston rod 98 has connected to it a floor engaging pad or foot piece 101, and it will be observed that upon the extension of the floor jack 39 by the supply of fluid between the head 96 and the top of the piston 97, the rear end of the base 31 may be raised with respect to the mine floor.

The intermediate frame 43 has been noted to comprise channel elements 92 and 93. These have their flanges facing towards each other and are connected together by the plate 91. These channel elements 92 and 93 are further connected together by at least two more cross-brace and support members, these being herein designated 105 and 106, and each being in the form of what might be called a very wide "U" and including a transverse base portion 107 and upstanding leg portions 108 (see Fig. 5), the members 105 and 106 being slotted to fit over the lower flange 109 of the channels, and being suitably secured, as by welding, to the channels. As will be later noted, the channel elements 92 and 93 are further connected together, forwardly of the cross-brace member 106, by a plate 170.

A reservoir 112 for hydraulic fluid is supported by the intermediate frame 43 in a position immediately forward of the plate 91 and is supported in any suitable manner, as by being welded to the latter and to relatively narrow block elements 113 and 114 which are welded at their outer sides to the channels 92 and 93.

Motors 115 and 116 (see Fig. 1) are secured, one to each of the channel elements 92 and 93, in horizontal, longitudinally extending positions. These motors at their rear ends drive through appropriate gearings (not shown), housed in gear casings 117 and 118 respectively, pumps 119-A and 119-B (see Fig. 1A) for hydraulic fluid. The functions and connections of these pumps will be later described.

Each of the channel elements 92 and 93 is adapted to provide a pair of guideways, a forward pair 120, 120 and a rearward pair 121, 121 (see Figs. 6 and 6A). The rearward guides 121, 121 are provided between the upper flanges 122 of the channel elements and angle irons 123 welded to the inner sides of the upright portions of the channel elements. At the forward end of the intermediate frame 43 the upper flanges 122 are cut away and pieces of bar stock 124 are welded to the channel elements in horizontal positions. Guide blocks or shoes 125 are adapted to slide on the angle irons 123 and to be prevented from lifting by the top flange portions 122 of the channel elements. Guide blocks 127, 127 are grooved as at 128, to fit the guide bars 124. The functions of the guide blocks 125 and 127, and their coaction with other structure, will be later described.

Sumping and withdrawing cylinder and piston mechanisms 130 (see Figs. 5 and 6) comprise cylinder elements 131, having bores 132, and piston elements 133 received in the bores 132 and having projecting piston rods 134 extending through rear heads 135 of the cylinder elements 131. The cylinder elements 131 are supported by means of horizontal transversely extending pivot pins 137 on brackets 138, bolted as at 139 to the inner sides of the upright portions of the channel elements 92 and 93, the pivotal supports being arranged, as shown in Fig. 6, relatively near the rearward ends of the guide bars 124. The piston rods 134 will have their connections later described.

To coact with the cables 45 there are provided at either side of the intermediate frame 43 cable-winding drums 141, 141 (see Figs. 4 and 8), rotatably mounted in fixed relation to the intermediate frame 43 and supported by bearing bushings 142 on pins or pintles 143, the opposite ends of which are mounted in openings 144 in the upright portions of the channel elements 92 and 93, and in other openings 146, in frame elements 147 secured in fixed relation to the channels 92 and 93, the frame elements cooperating with top plates 148 to form shielded spaces 149, in which the drums 141 are disposed. The drums have spur gears 150 secured to them, one gear secured to each drum, and these gears are driven by pinions 151, supported on sleeves 152 disposed between the upright portions of the channel members 92 and 93 and the adjacent frame elements 147 and journaled similarly to the drums 141 on pins or pintles 153 which extend between and are mounted on the channels and the frame elements. Secured in fixed relation to the pinions 151, to drive the latter, are larger gears 154, with which pinions 155 mesh. These pinions 155 are supported by and adapted to be driven through worm and worm wheel driving mechanisms not shown but contained within casings 156. The worms of these mechanisms are each driven through a shaft 157, universally connected to the worm at 158 and universally connected at 159 to a hydraulic motor 160 mounted in fixed relation, as the case may be, to the channel elements 92 or 93. Appropriately rigidly braced supporting and spacing means 162 is provided between the frame elements 147 and the outer walls of the channel elements 92 and 93. The cables 45 are wound on the drums 141, 141, one on each drum, and the winding in of either cable to a sufficient degree will necessitate either lateral movement of the main base 31 relative to the intermediate frame 43, or of the intermediate frame 43 relative to the main base, such relative movements occurring by reason of relative swing about the axis of the floor jack and being attended by relative sliding between the guide frame 41 and the cooperating guide shoe S. The cables extend rearwardly from the drums in strands 164, about pulleys or sheaves 165, mounted on brackets 166 secured to the transverse member 105, and then extend forwardly, in converging strands 167, and then around sheaves or pulleys 168 journaled as at 169 on the plate 170 forming a part of intermediate frame 43 and disposed beneath the lower edges of the channel elements 92 and 93. It will thus be evident that when either drum winds in, the other must pay out, unless there is slack in the cables, and that from its respective drum each cable leads back around a pulley 165, forward about a pulley 168, and then laterally for attachment to an attachment device 44, each such lateral run passing over a cable guide element 46.

For ease of reference the material disintegrating apparatus and the primary material-receiving and conveying apparatus will be referred to as the top structure and to this top structure there will be assigned the general reference character 171. It may first be noted with respect to it, that it is supported by the intermediate structure through sliding supports including the pairs of slide blocks 125, 125 and 127, 127. It may next be noted that it includes a relatively narrow rear portion designated by the general reference numeral 172 and a relatively wide forward portion designated by the general reference character 173 (see Fig. 1). The relatively narrow portion 172 includes a relatively long forward portion 172-F and a relatively short rearward portion 172-R (see Figs. 1A and 2A), and the portion 172-F is swingable vertically relative to the portion 172-R. The portion 172-R includes side elements or plates 176 and 177, and a bottom plate element 179, the latter constituting a lower deck plate for a flight conveyor 181 of the center chain type. An upper deck plate 182 extends between, and is welded to the side plates 176 and 177. There are thus provided a top surface 184 and a lower surface 185, these surfaces being traversed respectively by the rearwardly moving and the forwardly moving runs of the flight conveyor chain 181. The side plates 176 and 177 of the rearward section 172-R are rigidly held, as by spacers 187 and 188 and bolts 189, to the rearward ends of the shoe elements 125 (see Fig. 6A). Thus the rearward section 172-R is held in fixed angular relation to the shoe elements 125, though it will be appreciated that by employing elongated slots for some or all of the bolts 189 to traverse, an adjustability might be provided.

The structure 172-F is made up of side plates 176', 177', each having a reinforcing bar 178 welded to its outer side at its upper edge, a bottom plate 179' and an upper deck plate 182' (see Fig. 9), the same being secured together as by welding and occupying the same relative positions as the corresponding parts of the fixed structure 172–R. A pivot-providing shaft 191 is mounted at its opposite ends in the blocks 125 and extends through openings in bosses 192 welded or otherwise suitably held to the side plates 176' and 177', and between these bosses and the blocks 125 there are eye elements 193 surrounding the shaft 191 and having connected to them the rearward ends of the piston rods 134, these connections being indicated at 195. Since the piston rods are connected to the eye elements 193, and the eye elements surround the shaft 191, and the shaft is mounted in the blocks 125, and the structure 172–F is also mounted on the shaft 191, it will be evident that as the piston rods 134 move forwardly, the blocks 125 and all the structure which is connected with them, i. e. the structure 172–R and the structure 172–F (and, incidentally, the wide front structure 173) will be moved longitudinally relative to the intermediate frame 43, and, correspondingly, rearward movement of the piston rods will provide a retraction of the whole of the structure 171.

The structure 171 is connected through the structure 172–F with the sliding blocks 127 through connecting means generally designated 200 (see Fig. 6). These connecting means are so constructed that they may raise and lower the structure 172–F about the axis of the shaft 191. Conversely, they may at times cause the skid base 31 and the intermediate frame 43 to be raised at their forward ends from the mine floor. The arrangement whereby these operations are accomplished is best illustrated in Figs. 4 and 6. The side plates 176', 177' have openings 202, and surrounding the openings in each of the side plates annuli 203 are arranged, these being welded to the outer sides of the plates 176', 177'. Suitable bearing bushings 204 are supported by the annuli, and these bearing bushings each support a circular portion 206 formed integral with an arm structure 207. The arm structures and their portions 206 are conically bored at 208 to fit frusto-conical portions 209 formed at the opposite ends of a cross-shaft 210 which extends at its opposite ends through the openings 202. The arms are keyed as at 211 to the shaft, so that they must swing in unison.

It will be noted that if the shaft 210 is raised or lowered, the structure 172–F will also be raised or lowered at its forward end. The arm structures 207 each have two arm portions (see Fig. 6): a shorter one numbered 213, and another and longer one numbered 214. Each arm portion 214 has a pivotal connection at 215 with depending ears 216 carried by one of the sliding blocks 127. Each arm portion 213—the shorter one—is pivotally connected at 217 with the piston rod 218 of a hydraulic cylinder and piston mechanism 219, the cylinder element 220 of which is pivotally supported at 221 between projecting lugs or ears 222, 222, secured to a heavy cross-brace member 223 of which more will be said later, but which may at this time be noted to be rigidly connected with the frame 172–F. It will now be clear that when fluid is supplied to the hydraulic cylinder and piston mechanisms 219 and the piston rods 218 are projected, the shaft 210 will be lowered with respect to the pivotal connections 215, while, when the piston rods 218 are drawn further into the cylinders 220 than the position illustrated in Fig. 6, the shaft 210 will be lifted by the swinging of the arm structures 207 about the pivotal connections 215. There will thus be possible a raising and lowering, as may be desired, of the disintegrating apparatus which is supported at the forward end of the frame structure 172–F. And, as will later be made clear, there may at times be effected a raising of the forward end of the skid base 31 from the mine floor.

The side elements 176' and 177' at their forward ends are widened downwardly as at 235 (see Figs. 2 and 3), and they are connected, as by welding, with the cross member 223 previously mentioned, which is let into them as at 236; and they are further connected as will be later described. They also support the vein-attacking and disintegrating mechanism, as previously mentioned and as is later more fully described.

Between the downwardly extending portions 235, there are disposed the forward ends of inclined top and bottom deck plates 237 and 238, and the deck plate 237 coacts with the upwardly and rearwardly moving portion of the primary material-receiving and conveying flight conveyor chain 181. This chain passes at its forward end around a drive sprocket 239 mounted on a tubular foot shaft 240; and the deck plate 237, which is notched as at 241 at its forward end to provide room for the sprocket 239, has its upper surface extend substantially tangentially with respect to the tubular shaft 240. This shaft carries at either end thereof a stepped, generally cylindrical driver member 242 (see Fig. 10), and these members are suitably held, as by welding, to the tubular shaft, and have reduced portions 243 mounted in bearings 244 housed in cylindrical elements 245, which are carried by brackets 246 secured to the cross brace 223, which will be noted directly to underlie the top deck plate 237.

At this point it is desirable to note some further features of the structure at the forward end of the members 176', 177'. It has been noted that these are connected to the cross member 223. They are also connected as by welding to an upper cross bar 250 (see Figs. 1 and 3). The member 223, at its opposite ends is secured, as by welding, to a spaced pair of heavy vertical frame plates 251 (see Figs. 1 and 10), and the bar 250 extends to these plates and is also welded to them. To the outside of each plate 251 there is arranged a chain drive housing 252, each such housing providing a chamber 253, and having an inner wall 254.

The forward end of the deck plate 238 is slightly concave and is fixed to a nose piece 256 (see Fig. 3), which is of a length equal to the distance from one wall 254 to the other. Outside of the deck plate 238, and of the frames 176', 177', there are concave elements 258, 258 (see Fig. 10), each having an end wall 259 at its outer end and each open at its end adjacent the conveyor chain 181 and also forwardly; and these concave elements, which constitute material guides associated with helical clean-up devices 260, 260, are held as by welding to the nose piece 256, to the member 223, and each to one of the frame plate portions 235 and one of the frame plates 251, and the walls 254 and 259 are bolted to the elements 258.

The helical clean-up devices 260, 260 are in the form of scrolls, and are of opposite leads. They comprise helical flange portions 261 secured to cylindrical portions 262, which at their mutually more adjacent ends are provided with internally splined coupling elements 263 engaging with splines 264 formed on the ends of the reduced portions 243 previously mentioned. Thus it will be seen that the sprocket supporting shaft 240 will turn with the scrolls and the scrolls will turn together. The scrolls or helical clean-up devices 260, 260, are in fact the driving elements for the sprocket 239 and transmit rotation to the latter through their respective cylindrical portions 262.

The tubular portions 262 carry at their outer ends stepped elements 243' rotatably supported in bearings 244' carried by the walls 259, and carrying, outwardly of the bearings, sprockets 265, which are adapted to be driven by chains 266 from upper sprocket shafts 267, these latter shafts carrying chain driving sprockets 268, and being journaled in bearings 269 and 270 supported in housings 271, which are supported by gear casings 273 later described. The shafts 267 each carry a bevel driving gear 274, the drive for which will later be described.

Fig. 18 shows the mounting of the sprockets 268 on the shafts 267 to comprise preloaded friction disc clutches 275, each such clutch including discs 276 connected to a sprocket 268 and interleaved discs 277 connected to a shaft 267. A follower or loading plate 278 is pressed by a preloading spring 279 in a direction to load each clutch, and may have its pressure of application varied by an adjustable spring abutment 280. This arrangement will permit slippage if the scrolls or the conveyor becomes jammed.

Hydraulic roof jacks 285 (see Figs. 1, 10 and 12), of the double-acting cylinder and piston type, are arranged adjacent the vertical frame plates 251 adjacent the rearward end of the frame 173, and have roof-engaging plates 286 movable into contact with the mine roof by the admission of hydraulic fluid to the cylinders 287 of these jack devices, thus raising the piston rods 288 thereof and the plates 286. These roof jacks may if desired be similar in construction to the roof jacks 54.

Disintegrating mechanism generally designated 300 is mounted on the forward frame section 173 (see Figs. 1, 2 and 12). For simplicity of illustration various conventional features such as chain guiding and hold down means and material guiding and directing side walls or flanges have not been illustrated in the drawings. The side frames 251, 251 previously described support at their outer sides the gear housings 273, 273, these gear housings being mounted on structures 305, 305, which are mounted on the frames 251, 251. Each structure 305 comprises a side plate 306 carrying an inwardly projecting bearing support 307. The latter carry bearing sleeves 308, on which there are mounted ring-like portions 309 of a frame 310 which supports the disintegrating mechanism 300 for swinging in upright planes. The frame 310 is of built-up construction and includes upper and lower deck plates 311 and 312. The upper and lower runs, 313 and 314 respectively, of a series of disintegrating chains 315 travel over and pass beneath the plates 311 and 312. Herein there are five chains 315 illustrated, but it will be evident that this number may be varied upon appropriate design changes. The chains 315 are armed with disintegrating elements 316 carried in lugged blocks 317 which, with connecting links 318, make up the disintegrating chains 315. Herein, it may be noted, there are shown chain blocks 317 of the double-lugged type, and the pairs of bits which these blocks carry are arranged in lacings adapted to effect complete removal of the vein portion under attack, with minimum production of "fines"—a "tabletop" arrangement being illustrated.

A splined shaft 320 is journaled in bearing bushings 321 in the bearing supports 307 (see Fig. 12). This splined shaft carries a number of chain driving sprockets 323, there being five of these illustrated. These sprockets are connected by splines with the splined shaft 320, and between them, upon the splined shaft, there are mounted spacers 325. The splined shaft is driven at its opposite ends by similar drives, and one of these drives is illustrated in Fig. 12. Each of these drives includes a large bevel gear 330, splined to the end of the shaft 320. A bevel drive pinion 331 for each gear 330 is mounted on a longitudinally extending shaft 332 journaled at 333 in the gear housing 273. Each shaft 332 carries a spur driving gear 335 for a purpose shortly to be noted. A universal connection 336 connects each shaft 332 with a telescopic drive shaft arrangement 337 (see Fig. 19), which is connected by another universal drive connection 338 and other structure to be described, with the forward end of the rotor shaft of one of the motors 115, 116.

Each driving gear 335 meshes with a driven gear 340 carried on a shaft 341 arranged above a shaft 332 and suitably journaled in a housing 342. The rear end of each shaft 341 carries a bevel pinion 343 which meshes with and drives one of the bevel gears 274 previously described as the driving element for the scrolls and the conveyor drive sprocket. It will of course be understood that the structural features described are duplicated at the opposite sides of the disintegrating mechanism.

The nature of the extensible splined drive shaft connection 337 may be briefly noted: this comprises a driving splined shaft element 337' connected with the universal drive connection 338 and driven through the latter and having an unsplined, cylindrical portion 345 at its forward end to maintain it centered in an outer tubular member 346 which is connected with the universal drive connection 336. The tubular member 346 is secured at its rearward end to an internally splined element 348, which has splined engagement with the splined shaft 337'. It will thus be evident that a considerable range of extension of the driving connection is possible while at the same time any tendency to buckling is avoided. Desirably the cylindrical portion 345 and the internally splined element 348 may be formed of bronze when the shaft element 337' and the tubular member 346 are of steel.

Each universal drive connection 338 is supported in a radial and thrust bearing 350, supported in a cylindrical section 351 of a housing 352 (see Figs. 15 and 16). Another radial and thrust bearing 353 is supported in the opposite end of the cylindrical portion 351 mentioned, and serves to center a shaft 354 on whose forward end there is mounted, by a splined connection 356, the element 338A of the universal connection 338 which is supported directly by the bearing 350. Each shaft 354 carries an internal gear 358, and smaller gears 359 rotatably supported on pins 360 engage the internal gear and also a central driving pinion 362 which is mounted on the armature shaft 363 of one of the motors, 115, 116. Pins 360 are supported at their opposite ends in a two-part support structure 364. The support structure 364 also has secured to it a cylindrical brake-surface-providing enclosure element 365. The support structure 364 is supported for rotation by a radial and thrust bearing 366 disposed between the element 365 and the cylindrical section 351, and by another radial and thrust bearing 367 arranged between a circular flange 368 formed on the support structure 364 and a cylindrical surface 369 of the motor head. The element 365 has a cylindrical braking surface 370 about its periphery, and a brake band 371 is provided to engage frictionally with the surface 370. It will be evident that if the support structure 364 is held stationary there will be transmitted to the shaft 354 a drive at a predetermined reduced speed, that if it is allowed to rotate freely there will be no power transmitted to the shaft 354, and that if it is allowed to rotate at a relatively slow speed, a further reduced speed of drive will be transmitted to the shaft 354.

The following control for the brake band 370, and for the rotation and the holding stationary of the support structure 364, is provided (here see Figs. 15, 16 and 17). Recessed end portions 373 and 374 are carried by the brake band 371. With one of these, 374, an adjusting mechanism is associated, this including a swingable lever arm 375 pivotally supported at 376 in the housing 352 and having engagement with one end of a strut element 378 whose other end engages the recessed member 374. A lock nut equipped adjusting screw 380 is adapted to cooperate with the lever 375, and inward adjustment of this screw effects a take-up or tightening adjustment of the brake. Hydraulic brake-applying means is provided in association with the brake band 371, this being generally designated 400. It includes a lever 401 supported on a shaft 402 pivoted in the casing 352 and a strut 403 extends between the recessed end element 373 and the lever 401. To effect swing of the lever 401 in a brake-applying direction, the shaft 402 carries another arm 404 outside the casing and a hydraulic cylinder and piston device 406 is provided to swing the lever 404. This device 406 includes a cylinder 407 having a bore 408 in which a piston 409 is mounted for relative reciprocation between it and the cylinder. The piston has connected to it a piston rod 410 which extends through a suitably packed cylinder head 411 and is pivotally connected at 412 with the lower end of the lever 404. A spring 413 enclosed within the cylinder bore 408 and acting between the piston 409 and the other cylinder head 414, normally maintains the piston 409 in a position to release the brake band. A rod 416 is secured to the head 414 and extends through an abutment member 417 which is supported by trunnions 420 for turning about the axis of the trunnions but against movement longitudinally of the bore of the cylinder 407. As will be seen from Figs. 15 and 17, the device 406 is outside the casing 352 but supported on the latter. Between the abutment 417 and an adjustable follower 421, a much heavier spring (heavier than the spring 413) is provided, this heavier spring designated 422. Nuts 423 on the threaded end 424 of the rod 416 permit adjustment of the tension of this spring.

It will be evident that on admission of fluid to act on the piston 409—which can be accomplished through a fluid supply conduit 424—there will be a movement of the piston 409 toward the right in the cylinder bore 408. This will, of course, swing the lever 401 counterclockwise, and apply the brake band 371.

The following further statements may be made preliminary to an explanation of the mode of operation of the clutch applying mechanism. The spring 413 is provided for the purpose of reestablishing contact between the piston 409 and the head 411, and thus releasing the brake band, when the pressure fluid is released through the conduit 424. The spring 422 will be preloaded to the desired degree. When pressure is applied through conduit 424 the separative force provided between the piston 409 and the head 411 will tend to push the head to the left and the piston to the right. If the head were movable freely to the left it would so move and the piston 409 would not move to the right and effect tightening of the brake band. The head 411 is, however, attached to the cylinder 407 and the cylinder 407 cannot move out of contact with the trunnion-supported abutment plate 417 without compressing the spring 422, and that spring is a preloaded one. Accordingly, until the force acting on the piston 409 becomes greater than the force exerted by the spring 422 holding the cylinder 407 against the abutment 417, the piston 409 will move to the right, while the cylinder 407 remains stationary. When the brake-applying force gets high enough the preloading of the spring 422 will be exceeded by the force exerted by the head 411 on the cylinder 407, and the spring 422 will yield and the cylinder 407 will move away from the abutment 417. When the force acting between the piston 409 and the head 411 gets great enough so that the mutually opposite movements of the piston 409 and of the cylinder 407 result in contact between the piston and the right-hand end or head of the cylinder no further increases in brake-applying force will be possible. It will be clear that when the brake-applying force reaches a predetermined value the preloaded spring will yield, and that when the brake-applying force gets to some absolute value which is the maximum desired, and which is determined by the range of movement between the piston 409 and the cylinder 407 and the rate and preloading of the spring 422, there will be a definite limit on the brake-applying force.

Reverting to the disintegrating mechanism 300 (see Figs. 12 and 14) it may be noted that the top deck plate 311 and the bottom deck plate 312 extend between and are connected to side frame structures 431, 431, which form parts of the frame 310 and each of which carries an adjustable forward side plate element 432, whose position is variable longitudinally of the disintegrating apparatus by a screw and nut mechanism 433. The side plates 432 are connected by a cross shaft 434, and bearings 435 surrounding the reduced ends 436 of this cross shaft rotatably support sleeves 437 on which a plural sprocket-carrying, cylindrical element 438 is supported. This element carries, as shown, five sets of sprocket teeth forming guide sprockets 439. These several guide sprockets have the forward ends of the disintegrating chains pass about them. A stripper plate 440, having finger portions 441 between each pair of guide sprockets, is supported by the side plates 432 and forms a forward extension of the deck plate 311.

The upward swinging of the disintegrating mechanism and the lowering thereof are controlled by stationary arcuate racks 450, one at either side, and mounted at the forward ends of the stationary plates 251 (see Figs. 1, 2 and 12). With these racks there cooperate pinions 451 mounted on shafts 452 carried in bearings 453 mounted within the side frames 431. The shafts 452 are each provided with a generally cylindrical chain attachment member 455, the latter being splined as at 456 to the shafts 452 and each having a generally cylindrical portion 457 and a chain attachment lug 458 (see Fig. 14). Chain sections 459, one at either side of the central longitudinal vertical plane of the disintegrating apparatus, are connected to the lugs 458, after passing over the rearward sides of the portions 457 and extend forwardly and around cylindrical chain guide sleeves or sheaves 460 and then again rearwardly to stationary chain attachment lugs 461 formed on the side frames 431. The guide sleeves or sheaves 460 are rotatably supported on bearings 462 surrounding cylindrical portions 463 of elements 464 which cooperate with other elements 465 to form crossheads reciprocable in guides 466 carried by the side frames 431. The elements 464 of the crossheads are each centrally cylindrically bored as at 470 (see Fig. 13), and ball-like ends 471 on a transverse equalizer element 472 are received in the cylindrical bores. The equalizer element is connected by a vertical pivot pin 473 to the forward end 474 of a tubular piston rod 475 carrying a piston 476 reciprocable in the bore 477 of a cylinder 478, which cylinder is fixedly mounted at its rear end 479, by means of its rear head 480, on the swinging supporting frame 310 of the disintegrating apparatus (see Fig. 12). Interiorly of the piston structure just mentioned there is a boss 481 which is adapted to engage with a stop piston 482 carried in a cylinder 483 supported by the cylinder head 480. Means later described is provided to deliver fluid under pressure to the interior and rearward end of the piston rod and piston structure, 475, 476, and to the space to the left of the piston 482 in the cylinder 483, these features being later described in more detail. It will suffice here to point out that admission of fluid to the cylinder 478 to move the piston structure and the equalizer bar 472 to the right in Figs. 12 and 14 will cause the sheaves 460 to be moved to the right in those figures, and this will result in counterclockwise rotation of the members 455 and of the pinions 451 which turn with them. This counterclockwise rotation of the pinions will cause them to travel up the teeth of the arcuate racks 450 and produce a powerful and rapid upswing of the disintegrating apparatus. Venting of fluid from the rear end of the cylinder 478 will allow the weight of the disintegrating apparatus to cause the latter to swing downwardly and this will result in a movement of the equalizer bar 472 and the piston structure to the left in Fig. 12 until the boss 481 engages the piston rod 482 with the latter held extended by trapped hydraulic fluid. When this occurs, downward swing of the disintegrating mechanism will be stopped. It will be evident that a very effective arrangement for raising the disintegrating mechanism to effect a shearing operation is provided, and it will hereafter be seen that a readily controllable limit means for downswing (lowering) of the disintegrating apparatus is also present.

The delivery conveyor means 51 may next be described (here see Figs. 1A, 2A, 20, 21 and 22). It will have been observed that this must include provision for the reception of material from a primary disintegrated material-receiving and conveying apparatus whose delivery end moves longitudinally of the apparatus as a whole and also moves laterally as the disintegrating apparatus is caused to work in various sets of intersecting vertical planes. It has been previously noted also that the delivery conveyor means 51 is supported by a heavy plate 50. The plate 50 carries integrally with it a large eye-forming portion 501 in which there is formed a circular opening 502 which has an inwardly projecting annular flange 503 at its top. Within the opening 502, there is received a circular flange 504 integrally connected with a plate 505, whose construction will shortly be explained. The flange 504 is recessed annularly at 506. An annular bearing supporting plate 507 is secured to the heavy plate 50, being received in an annular recess 508 in the latter. A bearing-holding annular plate 509 is secured to the bottom of the flange 504. A Messinger bearing 511 is arranged in the annular recess 512 formed by the cooperation of flange 504, annular plate 509, plate 40 and annular plate 507, and this bearing rotatably supports the plate 505 for turning about a vertical axis relative to the heavy plate 50. The flange 504 has a circular opening 513 extending through it, and a smaller circular opening 514, coaxial with the opening 513, is formed in the plate 505. The plate 505 is curved at 516 to avoid interference when the plate is turned to position the delivery conveyor which is supported by it out of alignment with the primary disintegrating material-receiving and conveying apparatus. At its sides, the plate 505 has secured to it flange elements 521 and 522, these including relatively oblique forward portions 521a and 522a and mutually parallel rearward portions 521b and 522b. The portions 521b and 522b are connected at their rearward ends by tubular crossmember 524. A terminal or delivery belt conveyor 525, including side plates 526, a deck plate 527, and a plurality of spacing and reinforcing channels 528, is pivotally supported for vertical swinging on a transverse axis 529. The belt conveyor further comprises a suitable flexible belt 531, an idler roller 532 at its forward end, and a drive roller 533 at its rearward end, and a pair of rollers 534 and 535 whose function is to increase the wrap of the conveyor belt 531 on the idler and drive rollers. The drive roller is driven through a suitable worm and worm gear mechanism not shown enclosed in a housing 537 and driven through an extensible universal driving connection 538 by a motor 539 supported on one of the side plates 526. The delivery conveyor is vertically adjustable at its rearward end about the axis 529 by hydraulic cylinder and piston mechanisms 541 and 542 pivotally connected at their lower ends as at 543 to the frame portions 521b and 522b and pivotally connected at their upper ends as at 544 to the side plates 526.

For the direct receipt of disintegrated material from the primary disintegrated material-receiving and conveying apparatus, and for delivering it to the belt 531, there is provided a combined receiving pan or hopper and oscillating conveyor structure 550 (see Figs. 1A and 2A). This includes a relatively large, generally circular pan element 551 having a sloping peripheral wall 552 which is open at the rearward side of the pan element and extends as at 553 to deliver material onto the belt 531 at the lower end of the latter. The pan element 551 includes a bottom plate 555 which is fixedly secured to a frame structure 556 (see Figs. 20 and 21) including parallel side portions 557 connected together by crossmembers 558 and 559, diverging portions 560 and 561 to the rear of the parallel portions, and, still further to the rear, a short pair of more widely spaced parallel portions 562 and 563. Parallel motion devices 565 and 566 support the frame structure 556 for oscillatory movement about lower parallel axes 567 and 568 (see Fig. 21). The parallel motion structure 565 and 566 may conveniently be formed of tubular transverse portions 570 having arms 571 projecting in parallelism with each other radially from the tubular portions. Because the lengths of the tubular transverse portions 570 of the parallel motion members 565 and 566 are not the same—the rearward one being the longer—primed numbers are used with respect to the parts 570' and 571' of the rearward member 566. The forward member 565 is pivotally supported on a cross shaft 575 which passes through and supports its arm portions 571, while its tubular portion 570 surrounds and supports a shaft 577. The shaft 577 extends between and supports the side frame portions 557. The shaft 575 extends transversely of and is supported by the flanged element 504 (see Fig. 22). The parallel motion member 566 has its tubular portion 570' surrounding and supported by a transverse shaft 580 mounted at its opposite ends in lugs 581 supported on a cross channel member 582 which extends between the frame portions 521b and 522b and is rigidly secured to the latter (see Fig. 20). The arm portions 571' of the parallel motion member 566 are pivotally connected to stub shafts 583 carried by the parallel frame portions 562 and 563. It will thus be appreciated that the pan or hopper structure 551 may be given an oscillating movement while being maintained horizontal by simply exerting a thrust in the proper direction thereon. Since the parallel motion devices 565 and 566 normally incline forwardly at their tops, the normal position for the pan 551 will be its forward, lowered one.

To effect an oscillation of the pan 551, suitable to the feeding of the material rearwardly therefrom, any suitable means may be employed, and I have shown for the purpose of hydraulic motor 490 of the double-acting type (see Fig. 21), this including a cylinder 591, a piston 592, a piston rod 593, a pivotal connection 594 between the piston rod and ears 595 secured to the cross frame member 559, and a pivotal connection 597 between the rear end of the motor 590 and an ear 598 connected with the plate 505. A description of the apparatus for effecting fluid distribution in this motor will shortly be given, but it will be appreciated that the structure which will be disclosed for purposes of illustration is but illustrative of many which might serve the same purpose.

Before describing the motor 590 in further detail in its illustrative form, the apparatus for swinging the tail conveyor 525 to change its point of delivery may be explained. The flanged element 501 (see Fig. 22) is provided with an approximately semicircular peripheral groove 600, and a suitable chain, for example, a roller chain 601, is pinned as at 602 and 603, at its opposite ends, within the groove 600 and near the opposite extremities of the groove. The chain 601 is somewhat longer than the circumferential dimension of the groove and is passed around rollers 605 and 606 into engagement with a sprocket 607. Sprocket 607 is supported on a shaft 608 supported in suitable bearings in a gear housing 609, herein shown as of multi-part construction; and this gear housing is supported by portions 610 and 611 respectively on the plate 505 and on an angle bracket 612 secured to the channel 582. The shaft 608 has a worm wheel 615 secured to it, and a worm 616, suitably journaled in the gear housing 609, engages with the worm wheel and is adapted to be rotated to cause the worm wheel to effect rotation of the sprocket 607. Rotation of the sprocket 607 causes the flange element 501 and all the parts supported by the latter to swing about the axis of the turntable, swinging motion in either direction being effected by proper selection of the direction in which the sprocket 607 travels along the chain 601. The worm and worm wheel drive for the sprocket is accomplished by a reversible motor 620 (see Fig. 20) which is connected by a suitable shaft 621 and through universal joints 622 and 623 with the motor 620, and with a shaft 624 which drives the worm 616. The rollers 605 and 606 are carried by ears 625, 626 extending laterally from the housing 609.

Now reverting to the motor 590 (here see Figs. 23 and 24), it may be observed that its cylinder 591 has a bore 631 in which the piston 592 is reciprocable, and that this bore is closed, except for the openings traversed by the piston rod 593 at one end by a threaded head 632, a suitable packing as, for example, a chevron packing 633, and an inner head 634, the latter held in engagement with a shoulder 635 in the bore 631. The piston rod 593 passes through the two heads and the intervening packing 633. The end of the bore 631 opposite the head 634 is provided with a counter-bore 640 and beyond the latter a reduced bore 641 adapted to receive a nut 642 which holds the piston 592 upon a reduced portion 643 of the piston rod 593, the piston being clamped between the nut and a shoulder 644 on the piston rod. At this point, it may be noted that the head 634 has a portion of reduced diameter 646, whereby an annular relief 647 is provided, and it will be noted later that a distribution passage communicates constantly with this relief. To the right of the piston rod portion 643 and the nut 642 in Fig. 23 there is a further reduced portion 651 of the piston rod 593, this passing through a bore 652 formed in a partition portion 653 in the cylinder member 591. The portion 651 carries a still further reduced portion 655, a shoulder 656 being provided at the junction of the portion 655 with the portion 651, and a nut 657 being carried by the end of the reduced portion 655 in spaced relation to the shoulder 656. Cylinder member 591 is provided with an elongated bore 660 coaxial with the piston rod portions 655 and 651. This bore has three circumferentially extending, mutually longitudinally spaced grooves 661, 662 and 663. Groove 661 communicates with a series of openings 665 formed in a sleeve 666 pressed into the end of the bore 660 nearer the cylinder bore 631. Groove 662 communicates with a series of passages 668 opening through a sleeve 669 which is also pressed into the bore 660, and which engages a threaded head 670, threaded into the right-hand end of the member 590, see Figs. 23 and 24. A supply conduit for operating fluid, 672, communicates with the groove 663, which is midway between the sleeves 666 and 669. An exhaust conduit 673 communicates with an elongated passage 674 which, in turn, communicates near its opposite ends through passages 675 and 676 with the annular grooves 661 and 662 respectively. Between the adjacent ends of the sleeves 666 and 669, but relatively near the latter, the bore 660 has annular grooves 681 and 682 in communication with it. The groove 681 is connected by a distribution passage 683 with a port 684 opening into the forward end of the bore 631 and communicating with the relief space 647. The annular groove 682 is connected by a passage 686 with a distribution port 687 opening into the rearward reduced bore 641. A sleeve valve 690 is reciprocably received in the bore 660 between the sleeve portions 666 and 669, and is free to occupy positions in which it connects the fluid supply groove 663 respectively with the grooves 681 and 682. The hollow sleeve valve 690 fairly closely fits the periphery of the reduced piston rod extension portion 655, but there is a slight annular clearance between them. The hollow sleeve valve 690 is so formed as to avoid catching on the edges of the grooves 681 and 682, while yet alternately connecting these grooves with the central supply groove 663. It will be observed that it has narrow cylindrical end heads 691, 692, spaced by annular grooves, 693 and 694 respectively, from a longitudinally grooved but otherwise cylindrical central section 695, the grooves in the section 695 being numbered 696 and connecting the grooves 693 and 694 in communication with each other and with the supply groove 663. The heads 691 and 692, and the intermediate section 695 where there are no grooves in the latter, are all close sliding fits in the valve chamber. The distribution passages 683 and 686 may be connected with the supply groove 663 through spring pressed relief valves 698 and 699 respectively if the pressures in the ends of the cylinder bore 631 become great enough, due to the momentum of the discharge conveyor. Noting the angle at which the motor 590 is mounted (see Fig. 2A) and noting the manner of support of the hopper-like member 551, it will readily be appreciated that the piston 592 will normally, when fluid pressure is not being supplied through the conduit 672, occupy the extreme right-hand end of its cylinder, and the valve 690 will occupy a position corresponding to that shown in Fig. 24, that is, a position connecting supply groove 663 with the distributing groove 682, with the result that upon the admission of fluid to the conduit 672, the piston 592 will be moved to the left. As the piston rod 593 is moved outwardly from the cylinder it raises the structure supported on the parallel motion or parallel link members 565 and 566, while the weight of this structure aids the opposite movements of the piston rod. The effective area of the piston 592 at its right-hand or rearward end is larger than that at its left-hand or forward end, and the work it must do is therefore adequately handled. The motor 590 imparts a suitable jigging motion to the hopper or pan 551.

Assuming now that the motor is in operation, and that the parts are in the relative positions shown in Fig. 24, it will be understood that fluid is passing from the groove 663 through the peripheral grooving in the sleeve valve and through the groove 682 into the distributing passage 686 and then through the port 687 to the right-hand end of the piston 592. The piston is therefore moving toward the left and causing the pan or hopper 551 to be raised and simultaneously moved to the left in Figs. 1A and 2A. The parts are shown with the nut 657 just engaging the right-hand end of the valve 690, and, accordingly, the valve will immediately commence to be moved towards the position shown in Fig. 23. Continued movement of the piston 592 will cause the valve 690 to close off the communication of the groove 682 with the groove 663 and will establish communication between the groove 681 and the groove 663. It will also interrupt communication between the port 684 and the exhaust which has been subsisting through the passage 683, groove 681, the space to the left of the valve 690, the radial openings 665, the groove 661, the passage 675 and 674, and the exhaust conduit 673.

The stroke to the right of the piston 592 will be readily understood as, during it, fluid will be passed by the valve 690 from the supply conduit 672 to the groove 681 and thence via the passage 683 to the port 684 and into the left-hand end of the cylinder bore 631. This movement will be more rapid than the movement in the opposite direction, because the volume increase as the piston 592 moves to the right is less, per unit of distance moved, than is the case during leftward piston movement. When the piston gets to the position shown in Fig. 23, as it moves toward the right, it will commence to move the distributing valve 690 to the right, and the distributing valve will ultimately assume the position shown in Fig. 24. It should be noted that the distributing valve will be held in its opposite extreme positions by the unbalanced force of the fluid discharging on its way to exhaust from the grooves 682 or 681, as the case may be, and, there being an unbalanced pressure due to the fact that there will be both a larger area of the valves exposed to the flowing pressure fluid, and due to the fact that the porting between the spaces surrounded by the sleeves 666 and 669 is such as to maintain a higher pressure at the ends of the valves subjected to exhausting fluid than at the opposite ends. This may readily be understood if it be realized that the discharge from longitudinal passage 674 is so free that there is no tendency for fluid to pass around and act on both ends of the sleeve at once.

Fig. 27 shows a diagrammatic view of the hydraulic system of the entire apparatus. It will be observed that the reservoir 112 is connected by conduit 701 with the single pump 119a, and the discharge from this pump is connected by conduit 702 with a box section 703, of a plural unit hydraulic valve structure 704. This valve structure includes another box 705 connected by a conduit 706 back to the reservoir 112. Between the box section 703 and 705 there are, as illustrated, eight intermediate units or valve box sections, these being numbered severally starting at the left in Fig. 27, 710, 711, 712, 713, 714, 715, 716 and 717. Each intermediate valve box section contains a valve element (indicated only in broken lines and but conventionally shown) operated by an operating handle. The several valve operating handles are designated by the same numerals as the valve boxes but with primes. The valve box structure 704 is of well-known construction, and, in the neutral position of the several valve elements thereof, fluid flows freely from the supply conduit 702 right through to the return conduit 706, and therefore, when no use is being made of the fluid pumped by the pump 119a, the pump is not working against any substantial pressure, and thus heating of the hydraulic fluid is avoided. Whenever any valve is moved to fluid supply position it cuts off flow from the pump discharge to all valves later in the valve structure 704. The unit 703 has a relief valve 718 arranged in it, and this is adapted in a well-known manner, when an excessively high pressure exists in the box section 703, to permit a direct discharge of fluid through the several valve box sections to the return conduit 706. Each of the units, which controls the flow of fluid relative to a single-acting motor, when in one position supplies fluid to the motor, when in neutral position traps fluid in the motor, and vents fluid from its controlled motor when moved to its opposite extreme of travel. The valve unit 710 controls fluid flow through a conduit 719, having branches 424, relative to the brake band applying cylinders 407. As it will admit fluid to these cylinders and then be returned to neutral position to trap fluid in them, it will not interfere with the operation of the other apparatus. The valve unit 711 controls the floor jack 39 whose functions include both a stabilizing one and, more important, the function of lifting the rear end of the skid base 31 out of contact with the mine floor to facilitate a lateral swinging of the skid base relative to the mine bottom. The unit 711 controls the flow through a conduit 720 communicating with the jack 39.

The unit 717 controls the supply and venting of fluid through a conduit 722 to the rear end of the cylinder 478, which effects the power upswing of the disintegrating mechanism. In order that the maximum pressure to be exerted in effecting upswing may be set a different (and lower) value from the maximum determined by the relief valve 718, a separate adjustable relief valve 723 is arranged between a conduit 724 communicating with the conduit 722 and a conduit 725 communicating with a conduit 726 which leads back to the return conduit 706.

The roof jacks 54 have been noted to be of the double-acting type. The conduits 67 which lead to their lower ends are connected with a conduit 730 leading to unit 712 to one side of the center of the latter. Conduits 65 leading to the upper ends of the roof jacks 54 join each other and are connected by a conduit 731 leading to a point at the opposite side of the center of the unit 712. It will be evident that by appropriate manipulation of the handle 712' fluid can be supplied to the bottoms of both of the jacks 54 to extend the latter into engagement with the mine roof, the upper ends of the jacks 54 then being vented through the conduits 65, 65 and 731. Fuid can be trapped in the lower ends of jacks 54 by returning the handle 712' to mid-position. Fluid may be vented from the bottoms of the jacks 54 and supplied to the tops of the latter to effect collapse of these jacks by moving the handle 712' to opposite extreme position.

Unit 713 controls the sumping and withdrawing cylinder and piston mechanisms 130, 130. It controls the supply of fluid through a conduit 736 having branches 737 and 738 leading to the rearward ends of the cylinder and piston mechanisms 130, and also it controls venting of fluid through the connections 737, 738, and 736. In like manner it controls the supply and venting of fluid relative to a conduit 739 having branches 740 and 741 leading to the other ends of the cylinder and piston mechanisms 130, 130. It will be observed that when the handle 713' is moved in one direction from its neutral or central position, fluid will be supplied through the conduits 736, 737, and 738, and simultaneously vented through the conduits 740, 741 and 739, to effect sumping, that in the neutral position of the operating handle 713' both ends of the devices 130 will be disconnected both from supply and exhaust, but either end that contains fluid will have it trapped therein, and that the handle 713' in its opposite extreme position fluid supplied through conduit 739 and its branches 740 and 741 will effect retraction of the disintegrating mechanism, fluid being concurrently vented from the opposite ends of the devices 130 via the conduit 737, 738 and 736.

The rotary hydraulic motors 160, 160 for effecting lateral swinging between the skid base 31 and the intermediate frame 43 have fluid supply conduits 751 and 752 respectively. These are connected with the valve unit 714, and when one of these fluid supply connections is connected for the delivery of fluid through it to its respective motor 160 the other is connected to exhaust. The normal exhausts of the motors 160 are connected with each other by communicating conduits 753, 753, and the junction of the conduits 753, 753 is connected by a conduit 754 to the conduit 726, which, through the conduit 706, communicates with the reservoir 112. When the handle 714' is moved to one extreme position fluid is supplied to the conduit 751 and passes to one of the motors 160 to effect relative swing in one direction between the base 31 and the intermediate frame 43. The fluid exhausting from this motor 160 passes through the conduits 753, 753 to the other motor 160, and through the latter and the conduit 752 and the valve box 714 and conduit 706 back to the reservoir 112. If, for any reason, more fluid is exhausted by the motor being supplied with operating fluid through the conduit 751 than can be passed through the other motor 160, the excess passes through the conduits 754, 726 and 706 back to the reservoir. If it happens that the motor 160 whose conduit 752 is connected with the reservoir receives less fluid from the motor supplied through the conduit 751 than is taken by the first motor 160 at the rate the latter is rotated due to the pulling of cable off of its associated drum, the conduits 706, 726 and 754, and the lower conduit 753 in Fig. 27 will serve to supply the additional fluid. To effect supply of fluid through the conduit 752 and return of fluid through the conduit 751, the handle 714' is moved to its opposite extreme position, and the resultant mode of operation will be clear from what has just been said. In the intermediate position of the valve control handle 714' there is no supply of fluid effected to either of the motors 160, and there can be no venting of fluid from either motor through the conduits 751 and 752—wherefore the motors will be substantially locked against rotation.

The valve unit 715 controls the elevation controlling jacks 219, 219. It is adapted alternatively to supply fluid to a conduit 757 while venting fluid from a conduit 758 or to supply fluid to the latter conduit while venting fluid from the first. Conduits 757 and 758 are both branched, the first having branches 759 and 760 which lead to corresponding ends of the jacks 219, while branches 761 and 762 of the conduit 758 lead to the remaining ends of the jacks 219. It will be seen that proper manipulation of the handle 715' will permit the jacks 219 to be operated to raise the frame 173 and supported parts or to lower them and that in an intermediate position of the handle 715' the conduits 757 and 758 may both be cut off from communication both with supply and discharge.

The valve unit 716 controls the forward roof jacks 285. It is adapted to be moved oppositely longitudinally to supply fluid to a conduit 763 while venting fluid from a conduit 764, or to supply fluid to the latter conduit while venting fluid from the first. Conduits 763 and 764 are both branched, the first having branches 765 and 766 leading to the corresponding ends of the jacks 285, while branches 767 and 768 of the conduit 764 lead to the remaining ends of the jacks 285. Assuming that the conduits 765 and 766 lead to the lower ends of these jacks, and that conduits 767 and 768 lead to the upper ends of these jacks, it will be seen that by proper manipulation of the handle 716' fluid may be supplied through the conduit 763 and the branches 765 and 766 to the lower ends of the jacks 285 to raise the roof-engaging plates 286 into contact with the mine roof, fluid being concurrently vented from the upper ends of these jacks by the branch conduits 767 and 768 and the conduit 764. A reversal of the position of the handle 716' will make the conduit 764 a supply conduit, and the conduit 763 an exhaust conduit, and will effect contraction of the jacks 285. When the handle 716' is in central position the conduits 763 and 764 will both be cut off from communication with supply and discharge. Thus, after admitting fluid to extend the jacks it will be possible to maintain them extended by centralizing the control handle 716'. It will be understood, of course, that the branch conduits 765, 766, 767 and 768 are connected with the cylinders 287 of the jack devices 285.

The unit 717 has been previously described.

One more feature of the portion of the hydraulic system which includes the valve box structure 704 may be noted. The cylinder and piston mechanism 482, 483 which controls the limit of downswing of the disintegrating apparatus has a connection 770 leading to it. This connection can be vented under the control of a valve 771, which may desirably be of the needle type, through a conduit 772 leading to the drain conduit portion 726. Conduit 770 may have fluid supplied to it through a conduit 774 controlled by a stop valve 775. Conduit 774 communicates with conduit 739 and it will be readily understood that if the handle 713' is maintained in position to supply fluid to the conduit 739 after the retraction of the disintegrating apparatus has been completed, fluid pressure at the full setting of the relief valve 718 can be supplied past the valve 775 through the conduits 774 and 770 to the cylinder 483. If desired, a further relief valve controlled connection could be arranged between the conduit 770 and the return line 726, the setting of this relief valve being very high—higher than that of 718—but adapted to prevent any danger of breakage or bursting of parts in the event that the automatic motion-limiting means should be set in such a position that a roof fall could result in a subjection of it to extreme pressures.

The double pump 119–B supplies operating fluid for the remaining portions of the apparatus (see also Fig. 27). It includes sections 801 and 802. These are connected through a common supply conduit 803 with the reservoir 112. The section 801 delivers fluid to a conduit 804 which leads to the supply side of the belt-driving motor 539. From the belt-driving motor 539 a conduit 806 leads back to the reservoir 112. It will be evident that as the pump 801 may be continuously driven, the motor 539 will also be continuously driven unless some provision were made for enabling fluid supplied by the pump section 801 to be by-passed. To this end a cross-connection 808, controlled by a stop valve 809, is arranged between the conduits 804 and 806, and it will be evident that when the stop valve 809 is open, fluid will pass freely between the supply and discharge sides of the motor 539, and will not drive the latter; whereas, by closure of the stop valve 809, the motor 539 may be caused to drive the conveyor belt 531.

The pump unit 802 supplies fluid to a conduit 811 which leads to the supply box unit 812 of a control valve box 813. The box 813 has also a discharge unit or section 814, which is connected by a conduit 814' with the conduit 806. Between the box units 812 and 814 there are shown three manually controllable valve units 815, 816 and 817. Each of these valve units has a controlling handle bearing the same numeral as the unit which it controls, but primed to permit distinction and ease of reference. The unit 815 is adapted to control the cylinders 541 and 542 which effect a change in the height of discharge of the conveyor belt 531. The valve unit 815 controls the flow of fluid in opposite directions through a conduit 820 having branches 821 and 822 leading respectively to the cylinders 541 and 542, at the bottoms of the latter. When the operating handle 815' is moved in one direction from its neutral position, it effects supply of fluid from the supply conduit 811 to the conduit 820, and to the branches 821 and 822, and so to the jacks 541 and 542, and effects raising of the rear end of the delivery conveyor. Return of the handle 815' to "off" position traps fluid in the jacks. Movement of the handle 815' to its opposite extreme position vents the fluid previously supplied to the jacks and allows their collapse and the lowering of the delivery end of the belt conveyor.

It has been noted that the rotary motor 620 is adapted to effect opposite lateral swinging of the delivery conveyor. This motor is of the reversible type and may be driven in opposite directions in accordance with whether fluid is supplied to one side or to the other thereof. The motor 620 has two conduits 825 and 826 leading to it from the valve unit 816, and when the control handle 816' is moved in one direction from its intermediate position it will effect supply of fluid through the conduit 825 and concurrent exhaust of fluid through the conduit 826, and the motor 620 will be driven in one direction and through its connections with the worm 616 will cause the delivery conveyor to be turned in one direction about its vertical axis of swing. When the operating handle 816' is moved to its opposite extreme position, fluid will be supplied through the conduit 826 and vented through the conduit 825, and the motor 620 will be driven in the opposite direction, and the delivery conveyor will be swung oppositely from the direction of swing which occurs when conduit 825 is the supply conduit. When the operating handle 816' is moved to central position the motor 620 will not be driven in either direction and will be locked.

The valve unit 817 controls the supply of fluid to the shaker conveyor operating motor 590. It governs the delivery of fluid to a conduit 830 which has an accumulator 831 communicating with it between its ends. This accumulator is of well-known construction, and a "Greer" accumulator may be used very satisfactorily. This, as is well-known, includes a chamber in which a collapsible bag filled with an expansible fluid at a desirable pressure is arranged, and conventionally the bag carries a valve which governs the supply of fluid to the interior of the chamber outside the bag and also the venting of fluid from that chamber. The conduit 830 at its end opposite the valve mechanism 817 communicates with the supply conduit 672 previously referred to, while the conduit 673, also previously mentioned, leads from the motor 590 to the return conduit 806. It will be obvious that the motor 590 may be operated by moving the handle 817' to a position to effect fluid delivery to the conduit 830, and that the motor 590 may be stopped by moving the handle 817' to neutral position. The accumulator is adapted to offset the fluctuations in pressure in the supply lines 672, 830 during operation of the delivery conveyor 550 and to enable the better functioning of the relief devices or valves 698 and 699 if and when these operate to release fluid at high pressure back to the supply line.

While any mechanic skilled in the hydraulic art will be acquainted with valve structures suited for the purposes of the units or boxes 703, 705, 710—717, 812, 814 and 815—817, and the relief valves 718 and 833 (all of the boxes and valves being shown in Fig. 27), reference may be made to U. S. Patent No. 2,238,768 for illustrations of suitable constructions.

The mode of operation of the apparatus may now be described to a sufficient extent to enable its functioning to be thoroughly understood. It might be added, before taking up that description, that the valve box 812 also has a relief valve associated with it and indicated at 833 (previously mentioned and shown in Fig. 27), and that when this appropriately loaded relief valve opens fluid may pass in a well-known manner directly from the box unit 812 to the box unit 814. The valve units of this group, like those first described, each permit free flow past them from supply to exhaust when in neutral position, and each, when supplying fluid, cuts off fluid supply to the ones beyond it. Each also cuts off the line or lines it controls from both supply and vent when in mid-position.

No lengthy description of the mode of operation of the apparatus which has been described as illustrative of the invention in its various aspects is necessary. It will be understood that the apparatus may be brought to the position shown in full lines in Fig. 30 by swinging of the intermediate frame 43 and its supported parts about the axis of the floor jack 39, when the rear roof jacks 54, 54 are extended to hold the main base 31 stationary, this lateral positioning of the intermediate frame etc., being accomplished by effecting the winding in of cable by the repositioning drum 141 at the left-hand side of the intermediate frame 43, cable being concurrently drawn off of the other drum. Preliminary to sumping, the element 256 will be brought into scraping relation with the mine floor. Admission of fluid to the sumping and withdrawing cylinder and piston mechanisms 130 may then effect a sumping operation at the left-hand rib, the disintegrating apparatus having been lowered to the full line position shown in Fig. 28. The full line position shown in Fig. 30 is that at the start of sumping at the left-hand rib. After the sumping operation is completed the admission of fluid to the cylinder and piston mechanisms or "jacks" 219 (see Fig. 6) may be effected to insure a firm supporting of the element 256 and associated parts upon the mine bottom, and then the admission of fluid to the cylinder and piston mechanism 478 (see Fig. 12) may effect upswing of the disintegrating apparatus to a position corresponding to the upper broken line position of Fig. 28. Thereafter admission of fluid to the opposite ends of the cylinder and piston mechanisms 130 may be effected to accomplish the performance of the withdrawing operation, and the removal of the small, roughly triangular, depending projection from the roof of the mine chamber.

After the completion of the sumping, upswing and withdrawing cycle, the apparatus may be positioned for the effecting of the next similar cycle by moving the frame 43 and its supported parts angularly relative to the main base 31 in a clockwise direction about the axis of the floor jack 39. It will be understood that the disintegrating mechanism may have been lowered desirably only partially before this repositioning takes place, and that the pressure of the plate 256 upon the mine floor may desirably be relieved before this repositioning.

After the requisite repositioning operation has been effected a new cycle of sumping, upswing and withdrawing can be accomplished, followed by a further repositioning laterally, and additional sumping, upswing and withdrawal cycles, until the width of the face has been covered.

The intermediate frame 43 and its supported parts may then desirably be brought again to a position central of the working face, and then the frames 172-R and 172-F will be moved to their forward position relative to the remainder of the apparatus by the proper supply of fluid to the sumping and withdrawing cylinder and piston mechanisms 130. Fluid will then be admitted to the jacks 219 in such a manner as to effect the lifting of the forward end of the base 31 out of contact with the mine floor and to transfer weight to the element 256. Results of such an operation are shown on a small scale in Fig. 29. Thereupon, by admission of fluid to the other ends of the cylinder and piston mechanisms 130 the supporting structure for the frames 172-F and 172-R, down to and including the main base 31, may be fed all the way forward relative to the frames 172-R, 172-F and 173, passing through the position of Fig. 3 in transit, and the apparatus will then be in proper space relation to the newly formed face for a renewed attack on the mineral seam according to the procedure described hereinabove.

When it is desired to start a branch entry, such as is shown in Fig. 30, the following procedures may be carried out. The apparatus may be brought to a position adjacent the right-hand rib, at the requisite distance from the working face. If the apparatus were in the full line position shown in Fig. 30 at the commencement of the sumping operation—a somewhat unlikely, but quite possible, condition—the base 31 would be brought into such position with respect to the intermediate frame 43 and the parts the latter supports, that the longitudinal center line of the base would underlie the longitudinal center line of the intermediate frame 43. Thereafter the machine could be moved straight back until the hopper 551, with the delivery conveyor 525 swung parallel to the rib, gets fairly close to the rib. The apparatus would then be manipulated to bring the disintegrating apparatus into a position close to the prospective left-hand rib of the desired left-hand branch entry, and an initial notch for the full height of the entry would then be formed by a sump, upswing and withdraw cycle. This notch could not be very deep because of the potential interference of the wider support frame for the disintegrating mechanism with the rib, and accordingly, after this initial notch had been formed, the apparatus as a whole would be backed over toward the right-hand rib and would then have its disintegrating apparatus directed at a somewhat greater angle to the left-hand rib and the initial notch would be somewhat widened and somewhat deepened. When this second widening and deepening practice had been carried to its practical limit, the apparatus would then be backed away from the face, advanced to the right in Fig. 30, and, again having been angled somewhat more steeply to the left-hand rib, would widen and deepen the notch already twice worked upon, and would this time be able to materially widen its mouth. With one further retraction, bodily movement to the right in Fig. 30, and repositioning at a still greater angle to the left-hand rib, the apparatus would be in a position to proceed from the right-hand lower oblique position in Fig. 30 and form a branch entry of the full width shown in that figure. The number of side entry initiating operations necessary to permit the establishment of an entry of the full desired width will obviously depend on the width of the entry which is to be formed, but for an overall width of the main base 31 on the order of 7 feet, and working in an entry of 14 foot width, four or five preliminary attacks will bring the apparatus into position to form a branch entry of the full desired width.

With the full description of structure of the apparatus and the explanation of the operation of its components, this somewhat skeletonized description of its modes of operation will suffice. It is to be noted that the roof jacks can be employed to provide fixity of the parts which support them in relation to the mine and to provide stationary abutments relative to which portions of the apparatus to be advanced or retracted may be moved. The jacks 219 may be used for positioning of the clean-up devices during sumping and for effecting weight transfers during the advance of the main base relative to the frame elements 172-R and 172-F. The floor jack 39 finds utility in providing a pivot, relative to which the main base 31 may be swung laterally, when the repositioning of this main base, relative to the intermediate frame 43, is desired. When the main base 31 is to be repositioned relative to the intermediate frame 43, the jack 39 will have its floor-engaging plate 101 forced down to provide a pivot support on the mine floor, and the main roof jacks 54 will be collapsed, and when the jacks 219 have been used to effect a lifting of the forward edge of the main base 31—and indeed they may lift the whole length of it, if the main jack is sufficiently extended—the main base may be readily repositioned by the drum and cable devices, provided for that purpose, relative to the intermediate frame 43. When the intermediate frame 43 is to be laterally repositioned relative to the main base, the floor jack need not be extended, and the rear roof jacks 54 may be advantageously extended and the jacks 219 may be then used actually to effect at least a slight lifting of the clean-up mechanism, etc., from contact with the mine floor. Thus it will be seen that the apparatus may be advanced with a walking action step by step longitudinally along a straight path and step by step laterally along a curved path.

It will be evident that I have provided a very low, easily manipulated, flexible, and effective apparatus for the purpose described.

This application is a continuation of my copending application Serial No. 191,004, filed October 19, 1950 and now abandoned.

While there is in this application specifically described one form which the invention may assume in practice, it will be understood that this form of the same is shown for purposes of illustration and that the invention may be modified and embodied in various other forms without departing from its spirit or the scope of the appended claims.

What I claim is:

1. In combination, in a mining apparatus, a base, an elongated frame pivotally connected to said base on an upright axis near the rear end of said base and its own rear end for swinging laterally relative to said base, means for effecting such lateral swinging, a supporting structure slidably supported by said frame, a vein-attacking and disintegrating apparatus supported by said supporting structure at the forward end of the latter, and disintegrated material-receiving and conveying apparatus onto which said vein-attacking and disintegrating apparatus discharges and relative to which said vein-attacking and disintegrating apparatus is vertically movable, said disintegrated material-receiving and conveying apparatus supported by said supporting structure and discharging beyond the rear end of said frame.

2. In combination, in a mining apparatus, a base, an elongated frame pivotally connected to said base on an upright axis near the rear end of said base and its own rear end for swinging laterally relative to said base, means for effecting such lateral swinging, a supporting structure slidably supported by said frame, a vein-attacking and disintegrating apparatus supported by said supporting structure at the forward end of the latter, disintegrated material-receiving and conveying apparatus supported by said supporting structure and discharging beyond the rear end of said frame, and means for effecting a relative vertical adjustment between the forward end of said supporting structure and said base.

3. In combination, in a mining apparatus, a base, an elongated frame pivotally connected to said base on an upright axis near the rear end of said base and its own rear end for swinging laterally relative to said base, means for effecting such lateral swinging, a supporting structure slidably supported by said frame, a vein-attacking and disintegrating apparatus supported by said supporting structure at the forward end of the latter, disintegrated material-receiving and conveying apparatus supported by said supporting structure and discharging beyond the rear end of said frame, and means for effecting a relative vertical adjustment between the forward end of said supporting structure and said elongated frame.

4. In combination, in a mining apparatus, a bottom skid, an elongated frame pivotally connected to said skid on an upright axis adjacent the rear end of said skid and its own rear end for swinging laterally relative to said base, means for effecting such lateral swinging, an arcuate guide carried by said skid and extending transversely thereof and underlying and guiding said frame adjacent its forward end, means for effecting relative lateral adjustment between said guide and frame, a supporting structure slidably supported by said frame, a vein-attacking and disintegrating apparatus supported by said supporting structure at the forward end of the latter, and disintegrated material-receiving and conveying apparatus supported by said supporting structure and discharging beyond the rear end of said frame.

5. In combination, a base, generally horizontally extending guideways carried by said base, a frame extending in like direction with said guideways and providing a mounting for a work performing device, and means for supporting said frame for movement along said guideways and also in upright planes including (a) supporting means coacting with said guideways and reciprocable longitudinally thereof and providing a pivotal support for said frame and (b) other supporting means coacting with said guideways and reciprocable therealong and having connections with said frame providing for the effecting of relative up and down adjustment of adjacent portions of said frame relative to said guideways.

6. In combination, a base, guideways extending generally longitudinally of said base, supports supported and guided on said guideways adjacent the opposite ends of the latter, a frame pivotally supported on those of said supports which are adjacent one end of said guideways, said frame providing a mounting for a work-performing device at a point remote from such pivotal support, and means for supporting said frame from the others of said supports including means providing for the effecting of up and down adjustment of said frame relative to said last mentioned supports.

7. In combination, a mine floor engaging base, guideways extending generally longitudinally of said base, supports supported and guided on said guideways adjacent the opposite ends of the latter, a frame pivotally connected to those of said supports which are adjacent one end of said guideways, said frame providing a mounting for a work-performing device at a point remote from such pivotal support, and means for supporting said frame from the others of said supports providing for the effecting of up and down adjustment of said frame relative to said last mentioned supports, said frame having a portion engageable with the mine floor upon a predetermined downward movement thereof relative to the last mentioned supports.

8. In combination, in a mining apparatus, a base, an elongated frame pivotally connected to said base on an upright axis for swinging laterally relative to said base, means for effecting such lateral swinging, an arcuate guide carried by and fixed to said base and extending transversely thereof and underlying said frame adjacent the forward end of the latter, said guide and frame having connections between them precluding their relative vertical movement, means for effecting relative lateral adjustment between said guide and frame, a supporting structure slidably supported by said frame, a vein-attacking and disintegrating apparatus supported by said supporting structure at the forward end of the latter, disintegrated material-receiving and conveying apparatus supported by said supporting structure and discharging beyond the rear end of said frame, the forward end of said supporting structure having a mounting providing for its vertical adjustability relative to said elongated frame, and means for effecting relative movement in upright planes between said supporting structure and said frame first to bring the forward end of said supporting structure against an underlying surface and then to effect lifting of the forward end of said elongated frame and, with the latter, the forward end of said base.

9. In combination, a base, a frame pivotally mounted on said base for lateral swinging relative thereto and confined against vertical movement relative to said base, said frame providing longitudinal guideways, sliding blocks adjacent the opposite ends of said frame, an elongated support providing a mounting for a work-performing device at its forward end, a pivotal mounting for said elongated support on the sliding blocks adjacent the rearward end of said frame, an adjustable supporting means for said elongated support connecting the latter with the sliding blocks adjacent the forward end of said frame, and means for advancing and retracting said elongated frame coacting with the sliding blocks adjacent the rearward end of said frame.

10. In combination, a base, a frame pivotally mounted on said base for lateral swinging relative thereto, said frame providing longitudinal guideways, sliding blocks adjacent the opposite ends of said frame and slidably connected with the latter, an elongated support providing a mounting for a work-performing device at its forward end, a pivotal mounting for said elongated support on the sliding blocks adjacent the rearward end of said frame, an adjustable supporting means for said elongated support connecting the latter with the sliding blocks adjacent the forward end of said frame, and means for advancing and retracting said elongated frame including cylinder and piston devices connected with said frame and with the sliding blocks adjacent the rearward end of said frame.

11. In combination, a skid, a frame pivotally mounted on said skid for lateral swinging relative thereto, said frame providing longitudinal guideways, sliding blocks adjacent the opposite ends of said frame and slidably supported by the latter, an elongated support providing a mounting for a work-performing device at its forward end, a pivotal mounting for said elongated support on the sliding blocks adjacent the rearward end of said frame, an adjustable supporting means for said elongated support connecting the latter with the sliding blocks adjacent the forward end of said frame, and means for advancing and retracting said elongated frame supported by said frame and coacting with the sliding blocks adjacent the rearward end of said frame.

12. In combination, a floor supported skid base, a frame pivotally mounted on said skid base for lateral swinging relative thereto and confined against vertical movement relative to said skid base, means operatively connected between said skid base and said frame and including winding drums on said frame for effecting relative lateral swinging between them, an elongated support, means for slidably supporting said elongated support on said frame for advance and retraction relative to the latter, means for supporting the forward end of said elongated support providing for angular adjustment in vertical planes between the same and said frame, a floor-engaging foot carried by said elongated support in advance of said skid base, means for anchoring said skid base, means for effecting engagement of said foot with the floor and elevation of the forward end of said frame and skid base relative to said foot to cause said apparatus to be supported by said foot and the rearward end of said skid base, and means for selectively advancing said frame and skid base relative to said elongated support when said apparatus is supported by said foot and the rearward end of said skid base, or for advancing said elongated support relative to said frame and skid base while the latter is anchored.

13. In combination, a floor supported skid base, a frame pivotally mounted on said skid base for lateral swinging relative thereto and confined against vertical movement relative to said skid base, means operatively connected between said skid base and said frame for effecting relative lateral swinging between them, an elongated support, means for slidably supporting said elongated support on said frame for advance and retraction relative to the latter, means for supporting the forward end of said elongated support providing for angular adjustment in vertical planes between the same and said frame, a floor-engaging foot carried by said elongated support in advance of said skid base, means for anchoring said skid base, means for effecting engagement of said foot with the floor and elevation of the forward end of said frame and skid base relative to said foot to cause said apparatus to be supported by said foot and the rearward end of said skid base, and means for selectively advancing said frame and skid base relative to said elongated support when said apparatus is supported by said foot and the rearward end of said skid base, or for advancing said elongated support relative to said frame and skid base while the latter is anchored.

14. In combination, a floor supported skid base, a frame pivotally mounted on said skid base for lateral swinging relative thereto and confined against vertical movement relative to said skid base, means operatively connected between said skid base and said frame and including winding drums on said frame for effecting relative lateral swinging between them, an elongated support, means for slidably supporting said elongated support on said frame for advance and retraction relative to the latter and for angular adjustment in vertical planes between the same and said frame, a floor-engaging foot carried by said elongated support in advance of said skid base, means for anchoring said skid base, means for effecting engagement of said foot with the floor and elevation of the forward end of said frame and skid base relative to said foot to cause said apparatus to be supported by said foot and the rearward end of said skid base, and means for selectively advancing said frame and skid base relative to said elongated support when said apparatus is supported by said foot and the rearward end of said skid base, or for advancing said elongated support relative to said frame and skid base while the latter is anchored.

15. In combination, a base, a frame pivotally mounted on said base for lateral swinging relative thereto and confined against vertical movement relative to said base, said frame providing longitudinal guideways, sliding blocks adjacent the opposite ends of said frame and slidably connected with the latter, an elongated support providing a mounting for a work-performing device at its forward end and having a shoe engageable with a subjacent surface, a pivotal mounting for said elongated support on the sliding blocks adjacent the rearward end of said frame, an adjustable supporting means for said elongated support connecting the latter with the sliding blocks adjacent the forward end of said frame, means for advancing and retracting said elongated frame including cylinder and piston devices connected with said frame and with the sliding blocks adjacent the rearward end of said frame, and means for effecting relative movement in upright planes between said frame and elongated support to bring said shoe into engagement with a subjacent surface and to effect subsequent lifting of said frame and base relative to said shoe.

16. In combination, a skid, a frame pivotally mounted on said skid for lateral swinging relative thereto and confined against vertical movement relative to said skid, said frame providing longitudinal guideways, sliding blocks adjacent the opposite ends of said frame and slidably supported by the latter, an elongated support providing a mounting for a work-performing device at its forward end and having an underlying shoe engageable with a subjacent surface, a pivotal mounting for said elongated support on the sliding blocks adjacent the rearward end of said frame, an adjustable supporting means for said elongated support connecting the latter with the sliding blocks adjacent the forward end of said frame, means for advancing and retracting said elongated frame supported by said frame and coacting with the sliding blocks adjacent the rearward end of said frame, and means for effecting relative movement in upright planes between said frame and elongated support to bring said shoe into engagement with a subjacent surface and to effect subsequent lifting of said frame and base, at their forward ends, relative to said shoe.

17. In combination, a base-supported, elongated frame, guides carried by said elongated frame adjacent the forward end of the latter, slides supported by said guides, a second elongated frame, means for pivotally supporting said second elongated frame adjacent one end of said first elongated frame, power extensible mechanisms each pivotally connected to one of said frames and each having a power advanceable and retractable element, and force transmitting members pivotally connected to the second mentioned elongated frame and each having portions respectively operatively connected, at points offset from its pivotal connection to said second mentioned frame, with one of said slides and with the power advanceable and retractable element of one of said power extensible mechanisms.

18. In combination, a base supported elongated frame, guides carried by said elongated frame adjacent the forward end of the latter, slides supported by said guides, a second elongated frame, means for pivotally supporting said second elongated frame adjacent the rearward end of said first elongated frame, bell cranks pivotally connected to said second elongated frame and having arms, one of the arms of each bell crank pivotally connected to a slide, and cylinder and piston mechanisms each pivotally connected at its opposite ends respectively to one of the others of said arms and to said second mentioned frame.

19. In combination, a base supported elongated frame, guides carried by said elongated frame adjacent the forward end of the latter, slides supported by said guides, a second elongated frame, means for pivotally supporting said second elongated frame adjacent the rearward end of said first elongated frame, bell cranks pivotally connected to said second elongated frame and having arms, one of the arms of each bell crank pivotally connected to a slide, cylinder and piston mechanisms each pivotally connected at its opposite ends respectively to one of the others of said arms and to said second mentioned frame, and cylinder and piston mechanisms for effecting relative longitudinal movement between said frames each connected to said base supported elongated frame and to said means for pivotally supporting said second elongated frame.

20. In combination, a base supported elongated frame, guides carried by said elongated frame adjacent the forward end of the latter, slides supported by said guides, a second elongated frame arranged between the sides of said base supported elongated frame, means for pivotally supporting said second elongated frame adjacent the rearward end of said first elongated frame, bell cranks pivotally connected to said second elongated frame and having arms, one of the arms of each bell crank pivotally connected to a slide, cylinder and piston mechanisms each pivotally connected at its opposite ends respectively to one of the others of said arms and to said second mentioned frame, and cylinder and piston mechanisms for effecting relative longitudinal movement between said frames each connected to said base supported elongated frame and to said means for pivotally supporting said second elongated frame, and one at each side of said second elongated frame between the sides of said base supported elongated frame.

21. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, pinions supported by said second frame and meshing with said racks and means within said second frame for rotating said pinions.

22. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, pinions supported by said second frame and meshing with said racks and means within said second frame for rotating said pinions including cylinder and piston mechanism extending longitudinally of said second frame and means for converting the motion transmitted by said cylinder and piston mechanism into rotary motion and transmitting such rotary motion to said pinions.

23. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, gear elements supported by said second frame and meshing with said racks and means for rotating said gear elements including cylinder and piston mechanism comprising relatively rectilinearly moving cylinder and piston elements and means for converting the rectilinear motion transmitted by said cylinder and piston mechanism into rotary motion and transmitting such rotary motion to said gear elements including chains each fixed at one end and having their other ends connected with said gear elements to effect rotation of the latter upon exertion of traction on said chains and means operated by said cylinder and piston mechanism for exerting traction on said chains at points between the ends thereof.

24. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, gear elements supported by said second frame and meshing with said racks and means within said second frame for rotating said gear elements including cylinder and piston mechanism extending longitudinally of said second frame and means for converting the motion transmitted by said cylinder and piston mechanism into rotary motion and transmitting such rotary motion to said gear elements, said last mentioned means including chains each fixed at one end to said second frame and having their other ends connected with said gear elements to effect rotation of the latter upon exertion of traction on said chains and means operated by said cylinder and piston mechanism for exerting traction on said chains.

25. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecing swinging of said second frame relative to said first frame about said axis of pivotal support including arcuate racks supported by said first frame, gear elements supported by said second frame and meshing with said racks and means within said second frame for rotating said gear elements including cylinder and piston mechanism extending longitudinally of said second frame and means for converting the motion transmitted by said cylinder and piston mechanism into rotary motion and transmitting such rotary motion to said gear elements, said last mentioned means including chains each fixed at one end to said second frame and having their other ends connected wih said gear elements to effect rotation of the latter upon exertion of traction on said chains and means operated by said cylinder and piston mechanism for exerting traction on said chains, said traction exerting means including sheaves movable by said cylinder and said piston mechanism and said chain sections having bights in which said sheaves are disposed.

26. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, gear elements supported by said second frame and meshing with said racks and means within said second frame for rotating said gear elements including cylinder and piston mechanism extending longitudinally of said second frame and means for converting the motion transmitted by said cylinder and piston mechanism into rotary motion and transmitting such rotary motion to said gear elements, said last mentioned means including chains each fixed at one end to said second frame and having their other ends connected with said gear elements to effect rotation of the latter upon exertion of traction on said chains and means operated by said cylinder and piston mechanism for exerting traction on said chains, said traction exerting means including sheaves movable by said cylinder and said piston mechanism and said chain sections having bights in which said sheaves are disposed, said cylinder and piston mechanism pivotally engaging an equalizer bar at a point midway between the ends of the latter and said equalizer bar exending into said sheaves.

27. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, pinions supported by said second frame and meshing with said racks and means within said second frame for rotating said pinions including cylinder and piston mechanism extending longitudinally of said second frame and means for converting the motion transmitted by said cylinder and piston mechanism into rotary motion and transmitting such rotary motion to said pinions, said last mentioned means including chains each fixed at one end to said second frame and having their other ends connected with said pinions to effect rotation of the latter upon exertion of traction on said chains and means operated by said cylinder and piston mechanism for exerting traction on said chains, said traction exerting means including sheaves engaging said chains and said cylinder and piston mechanism having pivotally connected thereto an equalizer bar, and said equalizer bar extending into said sheaves.

28. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, pinions rotatably supported by said second frame and meshing with said racks and means within said second frame for rotating said pinions including cylinder and piston mechanism extending longitudinally of said second frame and means for converting the motion transmitted by said cylinder and piston mechanism into rotary motion and transmitting such rotary motion to said pinions, said last mentioned means including chains each fixed at one end to said second frame and having their other ends connected with said pinions to effect rotation of the latter upon exertion of traction on said chains and means operated by said cylinder and piston mechanism for exerting traction on said chains, said traction exerting means including sheaves and said cylinder and piston mechanism having pivotally connected thereto an equalizer bar, and said equalizer bar rotatably supporting said sheaves, the pivotal supports for said sheaves by said equalizer bar including ball-like portions at the ends of said equalizer bar surrounded by supports for said sheaves.

29. In combination, in a vein-attacking apparatus, a frame, a second frame swingably supported by said first mentioned frame and constituting a support for at least one vein-attacking device, means for swinging said second frame relative to said first mentioned frame including cylinder and piston mechanism within said second frame and means for limiting the swinging movement of said second frame relative to said first mentioned frame in one direction, including a second cylinder and piston mechanism arranged within the first.

30. In combination, in a vein-attacking apparatus, a frame, a second frame swingably supported by said first mentioned frame and constituting a support for a vein-attacking chain, means for swinging said second frame relative to said first mentioned frame including cylinder and piston mechanism within said second frame and means for limiting the swinging movement of said second frame relative to said first mentioned frame in one direction, including a second cylinder and piston mechanism arranged within the first.

31. In combination, in an apparatus for mining a mineral from the solid, a frame, a second frame pivotally supported on said first frame for swinging relative thereto, said second frame being elongated and supporting mineral vein-attacking means, driving means for said mineral vein-attacking means arranged with its axis in the same line with the axis of pivotal support of said second frame on said first frame, and means for effecting swinging of said second frame relative to said first frame about said axis of pivotal support including arcuate racks supported by said first frame, gear elements supported by said second frame and meshing with said racks and motor means within said second frame for rotating said gear elements including relatively reciprocable cylinder and piston elements extending longitudinally of said second frame and means for converting the motion transmitted by said motor means into rotary motion and transmitting such rotary motion to said gear elements, said last mentioned means including chains each having one end connected with one of said gear elements to effect rotation of the latter upon exertion of traction on said chains and means operated by said motor means for exerting substantially equal traction on said chains, said traction exerting means including an equalizer bar pivotally connected with one of said cylinder and piston elements at a point midway between its own ends and carrying at its ends means for exerting traction of said chains.

32. In an apparatus of the character described, a base, a supporting frame mounted on said base for swinging movement relative thereto about a vertical pivot arranged at the rear end of said base, means for connecting the forward end of said base with said frame for relative lateral swing in parallel planes to which said vertical pivot is perpendicular and a jack extensible to raise the rear end of said base, said jack including cylinder and piston mechanism coaxial with said pivot.

33. In an apparatus of the character described, a base, a supporting frame mounted on said base for swinging movement relative thereto about a vertical pivot arranged at the rear end of said base, means for connecting the forward end of said base with said frame for relative lateral swing in parallel planes to which said vertical pivot is perpendicular and a jack extensible to raise the rear end of said base, said jack including cylinder and piston elements coaxial with said pivot, the cylinder element of said jack mechanism having a portion to which said base is pivotally connected for swinging in horizontal planes in fixed relation to said jack mechanism.

34. In an apparatus of the character described, in combination, a base, a frame pivotally connected to said base for relative lateral swinging between the same on an upright axis at the rear of said base, a work performing instrument carried by said frame, an extensible floor-engaging jack for raising the pivotal connection between said frame and base to lift the rear end of said base out of contact with a subjacent surface, means connected with the forward end of said frame for lifting the latter together with said work performing instrument, means connecting said base at its forward end with said frame whereby lifting of the latter to elevate said work performing instrument also raises the forward end of the base out of contact with a subjacent surface, and means acting between said base and said frame at the forward ends thereof for effecting relative lateral movement of said base relative to said frame when said base is lifted out of contact with the subjacent surface.

35. In an apparatus of the character described, a base, a frame supported by said base for reciprocation longitudinally relative thereto, said frame including side plates between which a conveyor moves, and disintegrating mechanism supported by said frame, said disintegrating mechanism being wider than said frame and including side frame plates more widely spaced than said side plates and pivotally supporting a vertically swingable disintegrating apparatus, said side frame plates connected by upper and lower cross members connected to the side plates of said frame.

36. In combination, a skid base, a frame reciprocable longitudinally of said base, a work-performing device carried at the forward end of said frame, an intermediate frame mouned on said base and supporting said first mentioned frame for reciprocation longitudinally thereof, means for pivotally supporting said intermediate frame on said base on a vertical pivot, means for effecting relative forward and rearward movements between said reciprocable frame and said intermediate frame and effecting movement of either when the other is held stationary, roof jack devices at the rear corners of said base for holding said base stationary, a floor jack device coaxial with said vertical pivot, and roof jack devices supported by said first mentioned frame for holding the latter stationary.

37. In an apparatus of the character disclosed, a frame, and supporting and moving means for said frame including a floor engaging support, means for connecting said frame to said support for relative swinging about an upright axis, a support at the forward end of said frame, means for tilting said frame to elevate said front support above a floor surface while said floor engaging support is in supporting engagement with the floor, said tilting means operable when said front support is in engagement with the floor to move said floor engaging support relative to the floor to effect a transfer from the support on the floor of a large portion of the weight previously supported on the floor by said floor engaging support, to said front support, means for moving said floor engaging support when so moved relative to the floor longitudinally relative to said frame and for moving said frame longitudinally relative to said floor engaging support when the latter is in frame supporting engagement with the floor and said front support is elevated, and means acting between said frame and floor engaging support for swinging said frame horizontally relative to said floor engaging support when the latter is in frame supporting engagement with the floor and said front support is elevated.

38. In an apparatus of the character disclosed, a frame, and a creeper structure for said frame for moving the latter step by step over a floor surface and for effecting step by step lateral swinging movement of said frame, said creeper structure including a floor engaging support relative to which said frame is swingable about an upright pivot and providing at a point remote from said pivot an arcuate guideway, and a member connected to said frame and having an arcuate guide engaging said guideway, power means acting on the one and reacting on the other for effecting relative guided movement between said arcuate guide and arcuate guideway, a power device connected between said member and said frame for moving said frame longitudinally relative to said floor engaging support, a support for the front end of said frame, and a power device connected between said member and said frame for transferring the weight of said frame from said floor engaging support to said front support.

39. In an apparatus of the character disclosed, a frame, and a creeper structure for said frame for moving the latter step by step over a floor surface and for effecting step by step lateral swinging movement of said frame, said creeper structure including a floor engaging support providing an arcuate guideway and a member connected to said frame and having an arcuate guide engaging said guideway, power means acting on the one and reacting on the other for effecting relative guided movement between said arcuate guide and arcuate guideway, a power device connected between said member and said frame for moving said frame longitudinally relative to said floor engaging support, a support for the front end of said frame, a power device connected between said member and said frame for transferring the weight of said frame from said floor engaging support to said front support, said first mentioned power device being operable when said frame is supported by said front support and said floor engaging support is relieved of the weight of said frame to move said floor engaging support longitudinally relative to said frame.

40. In an apparatus of the character disclosed, a frame comprising a first floor engaging support, and a creeper base on which said frame is supported for movement of said frame step by step longitudinally and for swinging of said frame step by step laterally horizontally, said creeper base comprising a second floor engaging support, means for moving said second floor engaging support relative to said frame into frame supporting engagement with the floor, means connected between said frame and said creeper base for moving said frame longitudinally relatively to said second support when said second support is in supporting engagement with the floor, and means connected with said second support for swinging said frame laterally horizontally relative to said second support.

41. In an apparatus of the character disclosed, a frame comprising a first floor engaging support, and a creeper base on which said frame is supported for movement of said frame step by step longitudinally and for swinging of said frame step by step laterally horizontally, said creeper base comprising a second floor engaging support and an intermediate frame element relative to which there is longitudinal feeding of said first mentioned frame and between which and said second floor engaging support there is lateral swinging, means for moving said second floor engaging support relative to said first frame into frame supporting engagement with the floor, means connected between said frame and said intermediate frame element for moving said first mentioned frame longitudinally relatively to said intermediate frame element when said second support is in supporting engagement with the floor, and means connected with said second floor engaging support and with said intermediate frame element for swinging said first mentioned frame laterally horizontally relative to said second support.

42. In an apparatus of the character disclosed, a frame, and a creeper base for moving said frame step by step in a direction extending longitudinally of said frame and step by step laterally of said longitudinal direction, said base including a floor-engaging shoe providing a transverse guideway, a guide element guided for lateral movement along said guideway, means for successively moving said guide element along said guideway, for removing a substantial portion of the weight of said frame from said shoe and for moving said shoe transversely relative to said guide element, means for alternately moving said shoe longitudinally relative to said frame and for moving said frame longitudinally relative to said shoe, and means for supporting a substantial portion of the weight of said frame independently of said shoe during such longitudinal and lateral movements of said shoe relative to said frame.

43. In an apparatus of the character disclosed, a frame, and a creeper base for selectively moving said frame step by step in an endwise direction and step by step in a direction laterally of the length of said frame, said base including a floor-engaging member having a bottom surface adapted to rest upon the mine floor and which at times supports at least a substantial part of the weight of said frame, said floor-engaging member providing a transverse guideway, a guide element guided on said member for movement laterally along said guideway, means for moving said guide element along said guideway and for moving said floor-engaging member laterally along said guide element, means for alternately moving said floor-engaging member longitudinally of said frame and for moving said frame longitudinally relative to said member, means for removing a substantial portion of the weight of said frame from said floor-engaging member, and means for supporting said frame at least in part on the mine floor during such movements of said floor-engaging member longitudinally relative to said frame and laterally relative to said guide element.

44. In an apparatus of the character disclosed, a base structure movable step by step either laterally or longitudinally comprising a floor-engaging member providing a transverse guideway, a frame carried by said member and providing a longitudinal guideway along which said floor-engaging member is movable, a guide element laterally movable with said frame engaging said transverse guideway for movement therealong, mechanism including floor-engaging means for removing a substantial portion of the weight of said frame from said floor-engaging member and for transferring the weight of said frame from said floor-engaging means back to said member, means for alternately moving said floor-engaging member longitudinally along said frame guideway when the weight of said frame is removed therefrom as aforesaid and said frame, longitudinally relative to said member when the weight of said frame is transferred back to said member, and means for alternately moving said floor-engaging member laterally along said guide element when the weight of said frame is substantially removed from said member and said guide element together with said frame along said transverse guideway relative to said floor-engaging member when the weight of said frame is transferred back to said member.

45. In an apparatus of the character disclosed, a frame having a portion adapted to engage and provide support upon a mine floor, and a creeper base for said frame for effecting step by step longitudinal walking movement and step by step lateral swinging walking movement of said frame over a floor surface, said base embodying step by step moving and swinging means including a floor engaging support providing an arcuate guideway and a member connected to said frame and having an arcuate guide engaging said guideway, and power means connected between said member and said frame for moving said frame longitudinally relative to said floor engaging support when said frame portion is out of engagement with the mine floor and for moving said floor engaging support relative to said frame when the latter has said portion in engagement with the mine floor.

46. In an apparatus of the character disclosed, a frame, and a creeper base for said frame for effecting step by step longitudinal walking movement and step by step lateral swinging walking movement of said frame over a floor surface, said base embodying step by step moving and swinging means including a floor engaging support providing an arcuate guideway and a member connected to said frame and having an arcuate guide engaging said guideway, power means connected between said member and said frame for moving said frame longitudinally relative to said floor engaging support, a support for the front end of said frame, and power means connected between said floor engaging support and said frame for transferring the weight of said frame from said floor engaging support to said front support.

47. In an apparatus of the character disclosed, a frame, and a creeper base for said frame for effecting step by step longitudinal walking movement and step by step lateral swinging walking movement of said frame over a floor surface, said base embodying step by step moving and swinging means including a floor engaging support providing an arcuate guideway and a member connected to said frame and having an arcuate guide engaging said guideway, power means connected between said member and said frame for moving said frame longitudinally relative to said floor engaging support, a support for the front end of said frame, power means connected between said floor engaging support and said frame for transferring the weight of said frame from said floor engaging support to said front support, said first mentioned power means being operable when said frame is supported by said front support and said floor engaging member is relieved of the weight of said frame to move said floor engaging support longitudinally relative to said frame.

48. In an apparatus of the character described, a frame, and a creeper structure for moving said frame step by step in a longitudinal direction and for swinging said frame step by step laterally about an upright axis located at the rear of said structure, said creeper structure including a floor-engaging support having an arcuate guide thereon, said frame horizontally pivoted adjacent said upright axis for movement up and down of the portion thereof overlying said arcuate guide relative to the latter, power operated means for swinging said frame step by step laterally at its forward end relative to said arcuate guide and vice versa, and power operated means of which said floor engaging support forms a part for advancing said frame and said support step by step.

(References on following page)

References Cited in the file of this patent

UNITED STATES PATENTS

| | | |
|---|---|---|
| 1,148,975 | Kuhn et al. | Aug. 13, 1915 |
| 1,226,412 | Thomas | May 15, 1917 |
| 1,283,880 | O'Toole | Nov. 5, 1918 |
| 1,549,699 | Wilson | Aug. 11, 1925 |
| 1,588,563 | Wilson | June 15, 1926 |
| 1,639,050 | Morgan | Aug. 16, 1927 |
| 1,648,876 | Cartlidge | Nov. 8, 1927 |
| 1,752,714 | Wilcox | Apr. 1, 1930 |
| 2,062,657 | Joy | Dec. 1, 1936 |
| 2,130,677 | Turnbull | Sept. 20, 1938 |
| 2,165,675 | Pray | July 11, 1939 |
| 2,224,872 | Joy | Dec. 17, 1940 |
| 2,258,049 | Doberstein | Oct. 7, 1941 |
| 2,283,212 | Joy | May 19, 1942 |
| 2,315,091 | Fees | Mar. 30, 1943 |
| 2,329,875 | Cartlidge | Sept. 21, 1943 |
| 2,425,695 | Fees | Aug. 12, 1947 |
| 2,492,548 | Armstrong | Dec. 27, 1949 |